(12) United States Patent
Kim et al.

(10) Patent No.: US 8,248,911 B2
(45) Date of Patent: Aug. 21, 2012

(54) CELL SEARCH METHOD, FORWARD LINK FRAME TRANSMISSION METHOD, APPARATUS USING THE SAME AND FORWARD LINK FRAME STRUCTURE

(75) Inventors: Il-Gyu Kim, Choongcheongbuk-do (KR); Hyeong-Geun Park, Daejeon (KR); Nam-Il Kim, Daejeon (KR); Kap-Seok Chang, Daejeon (KR); Young-Hoon Kim, Daejeon (KR); Seung-Chan Bang, Daejeon (KR)

(73) Assignees: Electronics and Telecommunications Research Institute, Daejeon (KR); KT Corporation, Seongnam-Si (KR); SK Telecom. Co., Ltd., Seoul (KR)

( * ) Notice: Subject to any disclaimer, the term of this patent is extended or adjusted under 35 U.S.C. 154(b) by 921 days.

(21) Appl. No.: 12/093,415

(22) PCT Filed: Nov. 10, 2006

(86) PCT No.: PCT/KR2006/004712
§ 371 (c)(1),
(2), (4) Date: Oct. 3, 2008

(87) PCT Pub. No.: WO2007/055537
PCT Pub. Date: May 18, 2007

(65) Prior Publication Data
US 2009/0080385 A1 Mar. 26, 2009

(30) Foreign Application Priority Data

Nov. 10, 2005 (KR) .................. 10-2005-0107475
Aug. 7, 2006 (KR) .................. 10-2006-0074309

(51) Int. Cl.
*H04J 11/00* (2006.01)

(52) U.S. Cl. ........ 370/208; 370/510; 370/512; 455/502; 375/260

(58) Field of Classification Search .......... 370/203–211, 370/503–520; 455/502; 375/354–370
See application file for complete search history.

(56) References Cited

U.S. PATENT DOCUMENTS 6,741,578 B1 * 5/2004 Moon et al. ................... 370/335
(Continued)

FOREIGN PATENT DOCUMENTS

KR   10-2005-0003800   1/2005
(Continued)

OTHER PUBLICATIONS

International Search Report for PCT/KR2006/004712 dated Jan. 30, 2007.
(Continued)

*Primary Examiner* — Christopher Grey
(74) *Attorney, Agent, or Firm* — Kile Park Goekjian Reed & McManus PLLC

(57) ABSTRACT

Provided are a cell search method, a forward link frame transmission method, an apparatus using the methods, and a forward link frame structure in an Orthogonal Frequency Division Multiplexing cellular system, wherein the time it takes to perform a cell search and the complexity of the cell search can be reduced. The cell search apparatus includes a sync acquirer which receives a signal according to a forward link frame comprising a plurality of sync channel symbols each having different intervals between the adjacent sync channel symbols and achieves synchronization of the sync channel symbols using a sync channel of the received signal, and a boundary detector which detects a frame boundary using an interval pattern between the sync channel symbols, based on the achieved synchronization.

20 Claims, 21 Drawing Sheets

U.S. PATENT DOCUMENTS

| | | | |
|---|---|---|---|
| 6,865,177 B1* | 3/2005 | Park et al. | 370/350 |
| 6,920,123 B1 | 7/2005 | Shin et al. | |
| 7,558,354 B2* | 7/2009 | Peake et al. | 375/363 |
| 2002/0034944 A1 | 3/2002 | Tanno et al. | |
| 2005/0002369 A1* | 1/2005 | Ro et al. | 370/342 |
| 2005/0157637 A1* | 7/2005 | Feng et al. | 370/203 |
| 2007/0140106 A1* | 6/2007 | Tsai et al. | 370/208 |
| 2009/0219882 A1* | 9/2009 | Kim et al. | 370/330 |

FOREIGN PATENT DOCUMENTS

| | | |
|---|---|---|
| KR | 10-2005-0039263 | 4/2005 |
| KR | 10-2005-0041857 | 5/2005 |

OTHER PUBLICATIONS

Written Opinion for PCT/KR2006/004712 dated Jan. 30, 2007.

* cited by examiner

Code group 0 = {0, 1, 2, 3}
Code group 1 = {4, 5, 6, 7}
Code group 2 = {8, 9, 10, 11}

CELL SEARCH METHOD, FORWARD LINK FRAME TRANSMISSION METHOD, APPARATUS USING THE SAME AND FORWARD LINK FRAME STRUCTURE

CROSS-REFERENCE TO RELATED PATENT APPLICATION

This application claims the benefit of Korean Patent Application Nos. 10-2005-0107475 and 10-2006-0074309, respectively filed on Nov. 10, 2005 and Aug. 7, 2006, in the Korean Intellectual Property Office, the disclosures of which are incorporated herein by reference.

BACKGROUND OF THE INVENTION

1. Field of the Invention

The present invention relates to an Orthogonal Frequency Division Multiplexing (OFDM) cellular system, and more particularly, to a method of searching for a cell in an OFDM cellular system, an apparatus using the method, a system using the method, and a frame structure used in the method.

2. Description of the Related Art

In a Wideband Code Division Multiple Access (WCDMA) method of the 3$^{rd}$ Generation Partnership Project (3GPP), a cellular system uses a total of 512 long Pseudo-Noise (PN) scrambling codes in order to identify base stations of a forward link, wherein each adjacent base station uses a unique long PN scrambling code as a scrambling code of forward link channels. When a mobile station is turned on, the mobile station must acquire system timing of a base station to which the mobile station belongs (i.e., a base station of which a reception signal has the maximum amplitude) and a long PN scrambling code ID used by the base station. This process is called a mobile station's cell search process.

In WCDMA, in order to easily perform the mobile station's cell search process, the 512 long PN scrambling codes are grouped into 64 groups, and a primary sync channel and a secondary sync channel are included in the forward link. The primary sync channel is used for a mobile station to acquire slot sync, and the secondary sync channel is used for the mobile station to acquire a 10-msec frame boundary and long PN scrambling code group ID information.

The mobile station's cell search process in WCDMA is accomplished in 3 steps. In the first step, a mobile station acquires slot sync using a Primary Scrambling Code (PSC). In WCDMA, the same 15-slot PSC is transmitted every 10 msec, and PSCs transmitted by all base stations are the same signal. In the first step, slot sync is acquired using a matching filter suitable for the PSC.

In the second step, long PN scrambling code group ID information and a 10-msec frame boundary are acquired using the slot timing information acquired in the first step and a Secondary Scrambling Code (SSC).

In the third step, a long PN scrambling code ID used by a currently connected base station (BS) is acquired using the 10-msec frame boundary and the long PN scrambling code group ID information that were acquired in the second step and a common pilot channel code correlator. That is, since 8 long PN scrambling codes are mapped to a single code group, the mobile station detects the long PN scrambling code ID used in the current cell on the basis of outputs of the common pilot channel code correlator for 8 long PN scrambling codes corresponding to the long PN scrambling code group ID information.

In WCDMA, a sync channel consists of a primary sync channel and a secondary sync channel, and the primary sync channel, the secondary sync channel, a common pilot channel, and other data channels are multiplexed in a CDMA method based on a time domain direct sequence spread spectrum.

Recently, in the 3GPP, an OFDM-based wireless transmission technology standardization is being established as a part of 3$^{rd}$ Generation Long Term Evolution (3G-LTE) to compensate for disadvantages of WCDMA. The sync channel & common pilot channel structure and the mobile station's cell search process used in WCDMA are suitable for Direct Sequence Code Division Multiple Access (DS-CDMA) but cannot be applied to an OFDM forward link. Thus, a forward link sync channel & common pilot channel structure, a mobile station's initial cell search method, and an adjacent cell search method for handover are required in an OFDM cellular system.

SUMMARY OF THE INVENTION

The present invention provides a cell search apparatus and method in an Orthogonal Frequency-Division Multiplexing (OFDM) cellular system.

The present invention also provides a forward link frame transmission apparatus and method for supporting the cell search method.

The present invention also provides an OFDM cellular system to which the cell search method is applied.

The present invention also provides a computer readable recording medium storing a computer readable program for executing the cell search method.

The present invention also provides a structure of a forward link frame used in the cell search method.

According to an aspect of the present invention, there is provided a cell search apparatus in an Orthogonal Frequency-Division Multiplexing (OFDM) cellular system, the cell search apparatus including: a sync acquirer which receives a signal according to a forward link frame comprising a plurality of sync channel symbols each having different intervals between the adjacent sync channel symbols and achieves synchronization of the sync channel symbols using a sync channel of the received signal; and a boundary detector which detects a frame boundary using an interval pattern between the sync channel symbols, based on the achieved synchronization.

The sync channel symbols may be sequence-hopped with sync channel sequences corresponding to a code group to which a unique scrambling code of each cell belongs, and the boundary detector may detect sync channel sequence information of a target cell from the received signal based on the achieved synchronization, and detect a code group having the target cell based on the detected sync channel sequence information.

The code group may include single scrambling code as an element, and the boundary detector may detect the scrambling code belonging to the detected code group as a scrambling code of the target cell.

The forward link frame may include at least one common pilot channel symbol scrambled with the unique scrambling code of each cell, and the cell search apparatus may further include a code detector which calculates correlation values between each scrambling code belonging to the detected code group and the common pilot channel symbol, and detect a scrambling code of the target cell based on the calculated correlation values.

The code group may include a single scrambling code as an element, and the group detector may perform verification of a result of detection by the group detector by determining whether the detected scrambling code matches a scrambling code belonging to the code group detected by the group detector.

According to an aspect of the present invention, there is also provided a forward link frame transmission apparatus of a base station belonging to an OFDM cellular system in which a unique scrambling code is assigned to each cell, the forward link frame transmission apparatus including: a sync channel generator which generates sync symbols; and a frame transmitter which generates a forward link frame based on an OFDM symbol by arranging each sync channel symbol containing the generated sync symbol so as to have a different interval from adjacent sync channel symbols, and transmits a signal formed of the generated forward link frame.

The sync symbols may form sync channel sequence corresponding to each element of a hopping codeword corresponding to a code group to which a scrambling code of a base station belongs.

The code group may include single scrambling code.

According to an aspect of the present invention, there is also provided a cell search method in an OFDM cellular system, the cell search method including: (a) receiving a signal according to a forward link frame comprising a plurality of sync channel symbols each having different intervals between the adjacent sync channel symbols and achieving synchronization of the sync channel symbols using a sync channel of the received signal; and (b) detecting a frame boundary using an interval pattern between the sync channel symbols, based on the achieved synchronization.

The sync channel symbols may be sequence-hopped with sync channel sequences corresponding to a code group to which an unique scrambling code of each cell belongs, and the cell searching method may further include (c) detecting sync channel sequence information of a target cell from the received signal based on the achieved synchronization, and detecting a code group to which the target cell belongs, based on the detected sync channel sequence information.

The code group may include a single scrambling code as an element, and operation (c) may include detecting a scrambling code belonging to the detected code group as a scrambling code of the target cell.

The forward link frame may include at least one common pilot channel symbol scrambled with the unique scrambling code of each cell, and the cell searching method may further include (d) calculating correlation values between each scrambling code belonging to the detected code group and the common pilot channel symbol and detecting a scrambling code of the target cell based on the calculated correlation values.

The code group may include a single scrambling code as an element and operation (d) may include performing verification of a result of detection by the group detector by determining whether the detected scrambling code matches a scrambling code belonging to the code group detected by the group detector.

According to an aspect of the present invention, there is also provided a forward link frame transmission method of a base station belonging to an OFDM cellular system in which a unique scrambling code is assigned to each cell, the forward link frame transmission method including: (a) generating sync symbols; and (b) generating a forward link frame based on an OFDM symbol by arranging each sync channel symbol containing the generated sync symbol so as to have a different interval from adjacent sync channel symbols, and transmitting a signal formed of the generated forward link frame.

The sync symbols may form sync channel sequence corresponding to each element of a hopping codeword corresponding to a code group to which a scrambling code of a base station belongs.

The code group may include a single scrambling code.

According to an aspect of the present invention, there is also provided a structure of a forward link frame in an OFDM cellular system in which a unique scrambling code is assigned to each cell, the structure including a plurality of sync channel symbols having different intervals between the adjacent sync channel symbols in order to detect a frame boundary using an interval pattern between the sync channel symbols.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
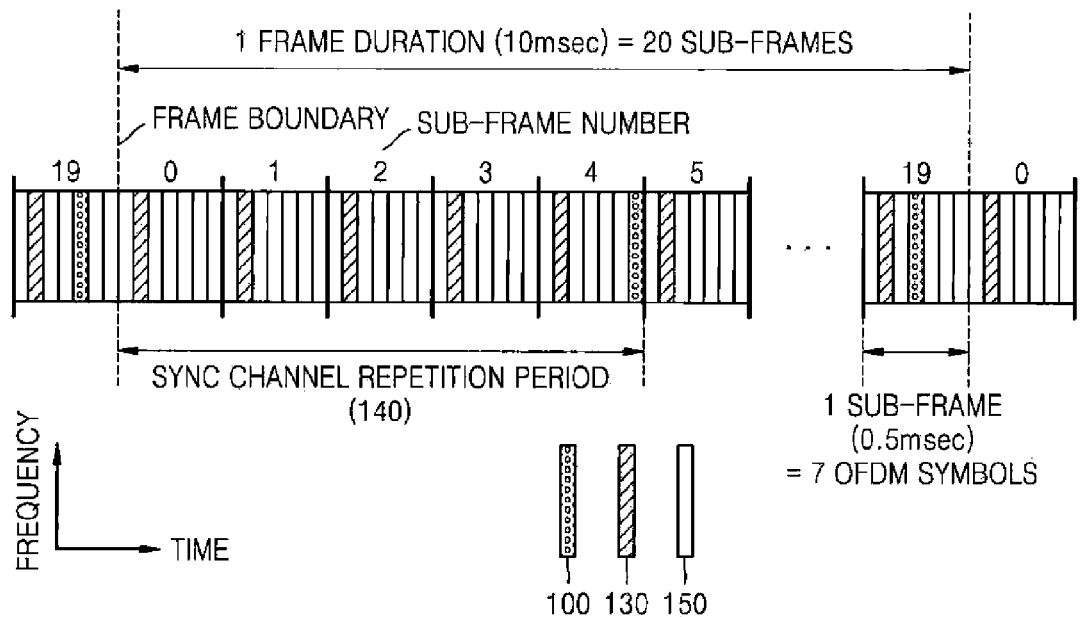
FIG. 1 illustrates a structure of a forward link frame according to an embodiment of the present invention.

The present invention will now be described more fully with reference to the accompanying drawings, in which exemplary embodiments of the invention are shown.

In general, each base station of an Orthogonal Frequency Division Multiplexing (OFDM) cellular system scrambles OFDM symbols using a long PN scrambling code. However, since the base station can use another scrambling code instead of the long PN scrambling code, any code used to scramble OFDM symbols is hereinafter called a scrambling code for convenience of description.

Although each base station according to an embodiment of the present invention can achieve transmission diversity using a method of including a plurality of transmission antennas, a delay diversity method, or other similar methods, it is assumed in the present specification for convenience of description that each of the base stations includes 2 transmission antennas.

Though a mobile station according to an embodiment of the present invention can achieve reception diversity using a method of including a plurality of reception antennas or other similar methods, it is assumed in the present specification for convenience of description that the mobile station includes 2 reception antennas. This mobile station must combine data of data paths according to the reception diversity. Though a simple summing method is used in the present specification as a data combining method, it will be understood by those of ordinary skill in the art that the data combining method is not limited to the simple summing method.

The present invention relates to a method of performing a cell search including sync acquisition, frame boundary detection, and scrambling code detection.

The term 'sync acquisition' will be used in the present specification as a comprehensive term for sync channel symbol timing detection, sync block timing detection, and sync block boundary detection. That is, since a position of a sync channel symbol can be obtained by detecting sync block timing, sync channel symbol timing is equivalent to the sync block timing. The term 'sync information' will be used in the present specification as a comprehensive term for information on sync channel symbol timing, information on sync block timing, and information on a sync block boundary. The term 'frame boundary detection' will be used in the present specification as a comprehensive term for frame boundary timing detection. The term 'frame boundary information' will be used in the present specification as a comprehensive term for information on frame boundary timing.

The term 'code group detection' will be used in the present specification as a comprehensive term for code group identifier detection and code group detection, and the term 'code group information' will be used in the present specification as a comprehensive term for a code group identifier and a code group. The term 'scrambling code detection' will be used in the present specification as a comprehensive term for scrambling code identifier detection and scrambling code detection, and the term 'scrambling code information' will be used in the present specification as a comprehensive term for a scrambling code identifier and a scrambling code.

The term 'Fourier transform' will be used for convenience of description in the present specification as a comprehensive term for discrete Fourier transform and fast Fourier transform.

Using the present invention, a mobile station can efficiently search a cell by using position modulation of a sync channel symbol. That is, a forward link frame according to an embodiment of the present invention includes a plurality of sync channel symbols, and by differentiating intervals between the adjacent sync channel symbols, the mobile station can efficiently search a cell.

FIG. 1 illustrates a structure of a forward link frame according to an embodiment of the present invention.

Referring to FIG. 1, the forward link frame has a 10-msec duration and includes 20 sub-frames. In FIG. 1, the horizontal axis represents time, and the vertical axis represents frequency (OFDM subcarrier). Each of the 20 sub-frames 110 has a length of 0.5-msec and includes 7 OFDM symbols. The OFDM symbols can be classified into sync channel symbols 100, common pilot channel symbols 130, and data channel symbols 150, and each sub-frame includes single common pilot channel symbol 130. In addition, each of the 20 sub-frames includes a single or no sync channel symbol 100. In the current embodiment, a single sync channel symbol 100 duration exists at every 5 sub-frames, and thus a total of 4 sync channel symbol durations exist in the forward link frame. In this case, a sync channel symbol repetition period 140 is the same as a length obtained by summing the lengths of 5 sub-frames, and thus a repetition period of the total sync channel symbols in the forward link frame is 4. For convenience of description, the sync channel symbol repetition period 140 is called a sync block. That is, FIG. 1 shows that the number $N_b$ of sync blocks in a single frame (10 msec) is 4.

The forward link frame according to the current embodiment includes the plurality of sync channel symbols 100 having different intervals between the adjacent sync channel symbols 100. A cell search apparatus, such as a mobile station, according to an embodiment of the present invention, obtains synchronization of the sync channel symbol 100 using characteristics of a sync channel, and detects a frame boundary using interval patterns of the sync channel symbols 100 included in a forward link signal.

Figure 2A:
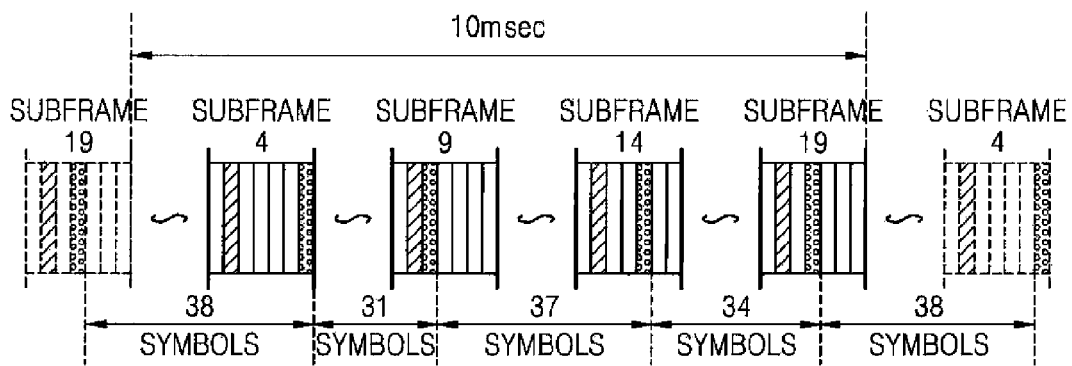
FIGS. 2A and 2B each illustrate position modulation of a sync channel symbol according to embodiments of the present invention.
Figure 2B:
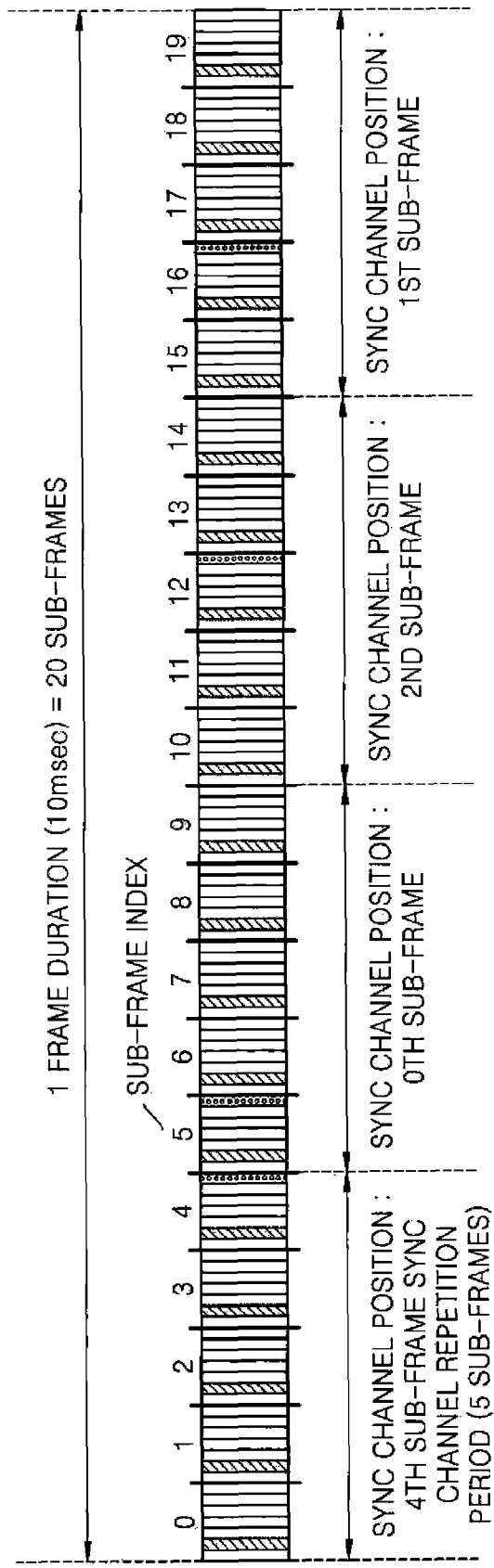

FIGS. 2A and 2B each illustrate position modulation of a sync channel symbol according to embodiments of the present invention.

Referring to FIGS. 2A and 2B, intervals between the sync channel symbols included in a forward link frame are all different.

Specifically in FIG. 2A, the forward link frame according to the current embodiment includes the sync channel symbol at the last sub-frame from among the 5 sub-frames in a sync block. That is, a sync channel exists in the sub-frame having sub-frame indexes 4, 9, 14, and 19, wherein positions of the sync channel symbols in the sub-frame having the sync channels are different. Referring to FIG. 2A, the positions of the sync channel symbols in each sub-frame having the sync channel is different at each sub-frame, and as a result, intervals between adjacent sync channel symbols are different, such as 38 symbols, 31 symbols, 37 symbols, and 34 symbols.

In FIG. 2B, the positions of the sync channel symbols in the sub-frame are the same, but intervals of sub-frames, wherein the sync channel symbols are located, are different.

Referring to FIG. 2B, in the first sync block, the sync channel is located at the last OFDM symbol of the sub-frame corresponding to sub-frame index 4. In the second sync block, the sync channel is located at the last OFDM symbol of the sub-frame corresponding to sub-frame index 5. In the third sync block, the sync channel is located at the last OFDM symbol of the sub-frame corresponding to sub-frame index 12. In the fourth sync block, the sync channel is located at the last OFDM symbol of the sub-frame corresponding to sub-frame index 16. That is, the sync channels are always located at the last OFDM symbol of the sub-frames in each sync block, but the positions of the sub-frames wherein the sync channel symbol is located are different in each sync block.

Hereinafter, methods of obtaining a frame boundary in a cell search method of an embodiment of the present invention using the above described structures of the forward link frame will be described.

A first method of obtaining a frame boundary is as follows. In a first step of a cell search process, a cell search apparatus obtains synchronization of a predetermined sync channel symbol using a correlator or a differential correlator, which will be described later. In a second step of the cell search process, the cell search apparatus measures an interval between the predetermined sync channel symbol and an adjacent common pilot channel symbol, and detects a frame boundary by comparing the measured interval and a pre-stored interval pattern between a sync channel symbol and a common pilot channel symbol. In a third step of the cell search process, the cell search apparatus detects a scrambling code by performing a pilot correlation on the confirmed common pilot channel symbol based on the detected frame boundary. In this case, the second step of the cell search process may further include detecting a code group.

Unlike the first method which obtains the frame boundary using the interval between the sync channel symbol and the adjacent common pilot channel symbol in the second step of the cell search process, a second method of obtaining a frame boundary obtains synchronization using an interval between adjacent sync channel symbols. A first step is the same as the first step of the first method. In a second step of the cell search process, a cell search apparatus detects the interval between the adjacent sync channel symbols based on sync channel symbol timing obtained in the first step, and detects a frame boundary by comparing the detected interval and a pre-stored interval pattern between sync channel symbols. In a third step of the cell search process, the cell search apparatus detects a scrambling code by performing a pilot correlation on a common pilot channel symbol based on the detected frame boundary. Here, the second step may further include detecting a code group.

The methods of obtaining a frame boundary described above are exemplary embodiments of a method of detecting a frame boundary using an interval pattern between adjacent sync channel symbols, and thus are not limited thereto.

Figure 3:
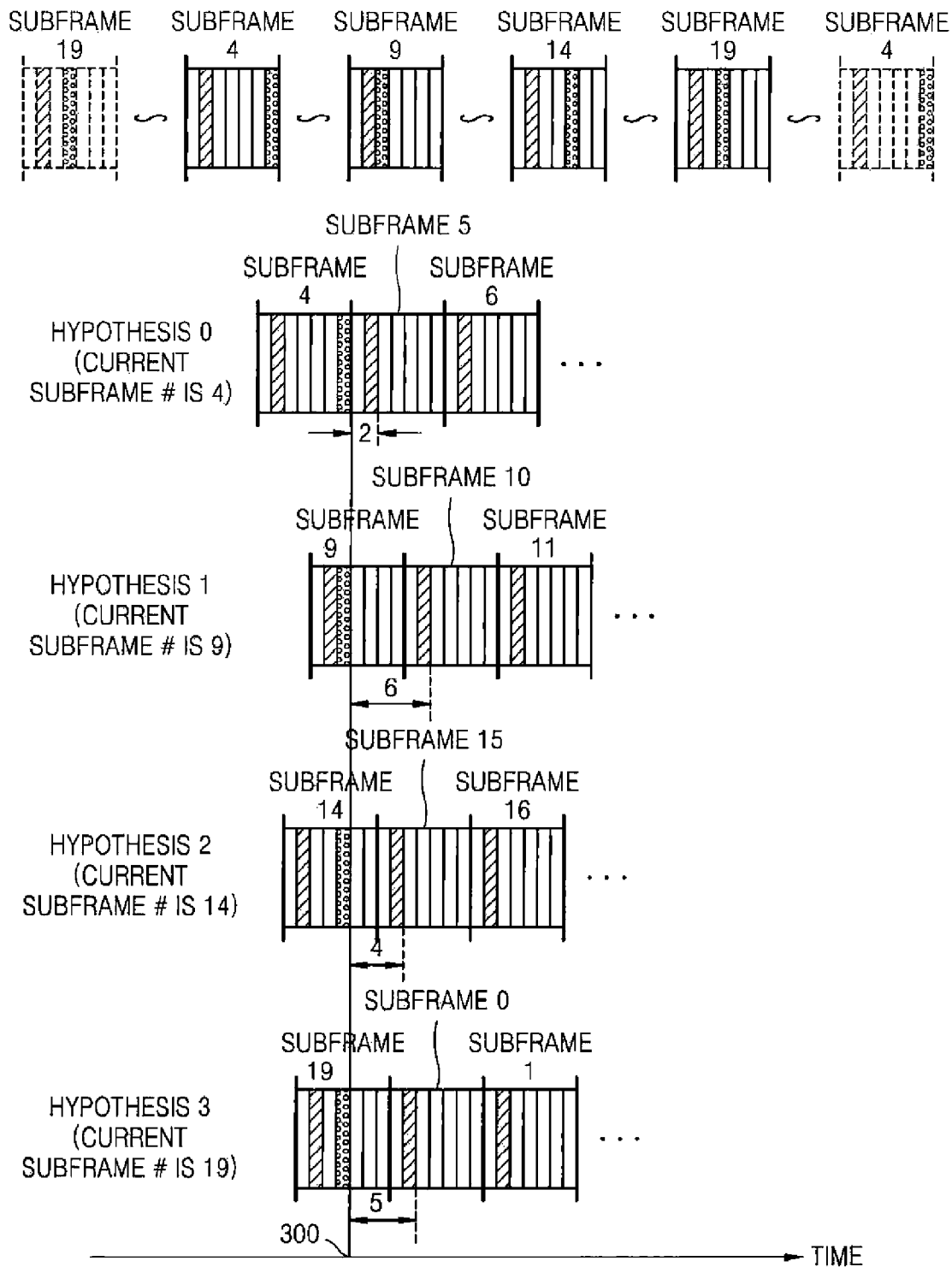
FIG. 3 is a conceptual diagram for explaining how a frame boundary of a mobile station is obtained according to an embodiment of the present invention.

FIG. 3 is a conceptual diagram for explaining how a frame boundary of a mobile station is obtained according to an embodiment of the present invention, specifically using the position modulation illustrated in FIG. 2A and the first method of obtaining a frame boundary.

A mobile station obtains a predetermined sync channel symbol timing 300 using a sync channel symbol correlator or a differential correlator, and obtains a frame boundary using an interval between an adjacent common pilot channel symbol and the sync channel symbol timing 300. When the obtained sync channel symbol timing 300 is a sync channel symbol in the fourth sub-frame (hypothesis 0), the interval between the adjacent common pilot channel symbol and the sync channel symbol timing 300 is 2 symbols. When the obtained sync channel symbol timing 300 is a sync channel symbol in the ninth sub-frame (hypothesis 1), the interval between the adjacent common pilot channel symbol and the sync channel symbol timing 300 is 6 symbols. When the obtained sync channel symbol timing 300 is a sync channel symbol in the 14th sub-frame (hypothesis 2), the interval between the adjacent common pilot channel symbol and the sync channel symbol timing 300 is 4 symbols. When the obtained sync channel symbol timing 300 is a sync channel symbol in the 19th sub-frame (hypothesis 3), the interval between the adjacent common pilot channel symbol and the sync channel symbol timing 300 is 5 symbols.

As described above, the intervals between the sync channel symbol timing 300 and the adjacent common pilot are different in each hypotheses 0 through 3. By performing a test on the hypotheses 0 through 3, the mobile station determines in which sub-frame the obtained sync channel symbol timing 300 exists. Accordingly, a frame boundary of a forward link signal received from a cell to which the current mobile station belongs can be detected.

Figure 4:
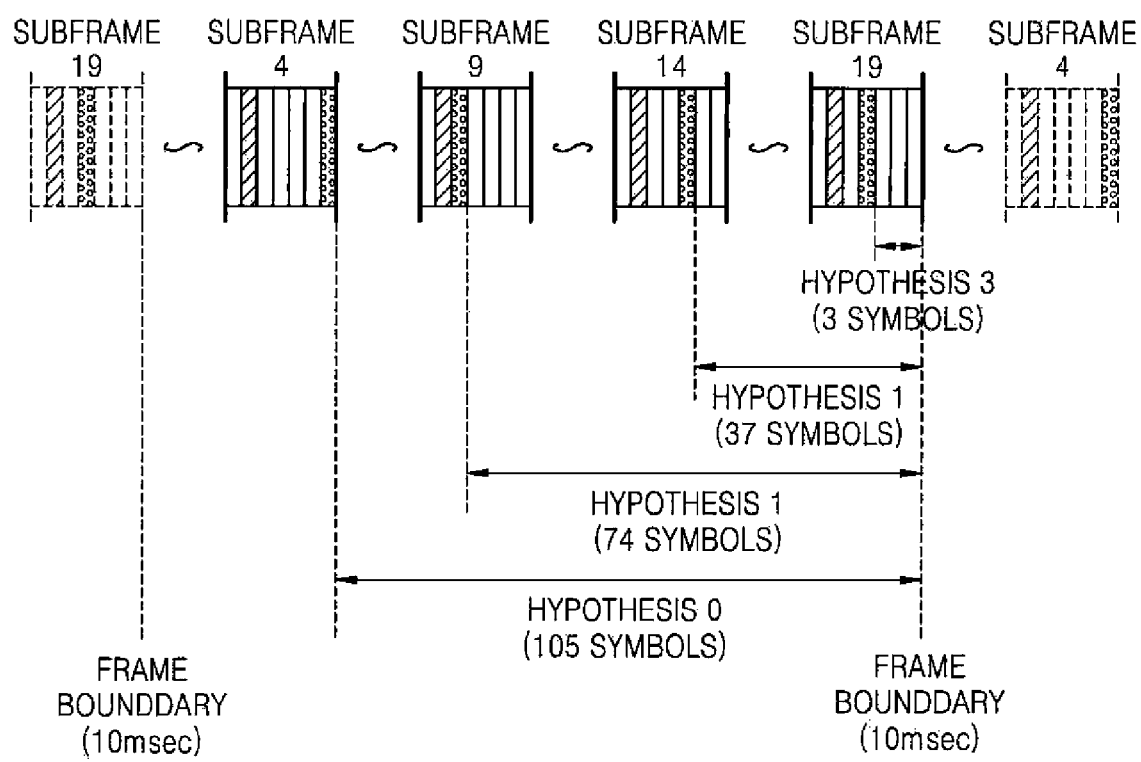
FIG. 4 illustrates an example of how a frame boundary is provided in each hypothesis illustrated in FIG. 3 when the position modulation illustrated in FIG. 2A is used.

FIG. 4 illustrates an example of how a frame boundary is provided in each hypothesis illustrated in FIG. 3 when the position modulation illustrated in FIG. 2A is used.

Referring to FIG. 4, in hypothesis 0, an interval from the obtained sync channel symbol timing 300 to the frame boundary is a total of 105 (15×7) symbols, in hypothesis 1, it is 74 (10×7+4) symbols, in hypothesis 2, it is 37 (5×7+2) symbols, and in hypothesis 3, it is 3 symbols.

Upon obtaining the frame boundary by using the above method, the mobile station detects a scrambling code that is being used by the current cell, by using the common pilot channel.

The mobile station may use a plurality of common pilot channel symbols continuously received from several sub-frames in the second step of the cell search process, in order to increase cell search efficiency. In this case, the probability of a false alarm can be reduced.

Figure 5:
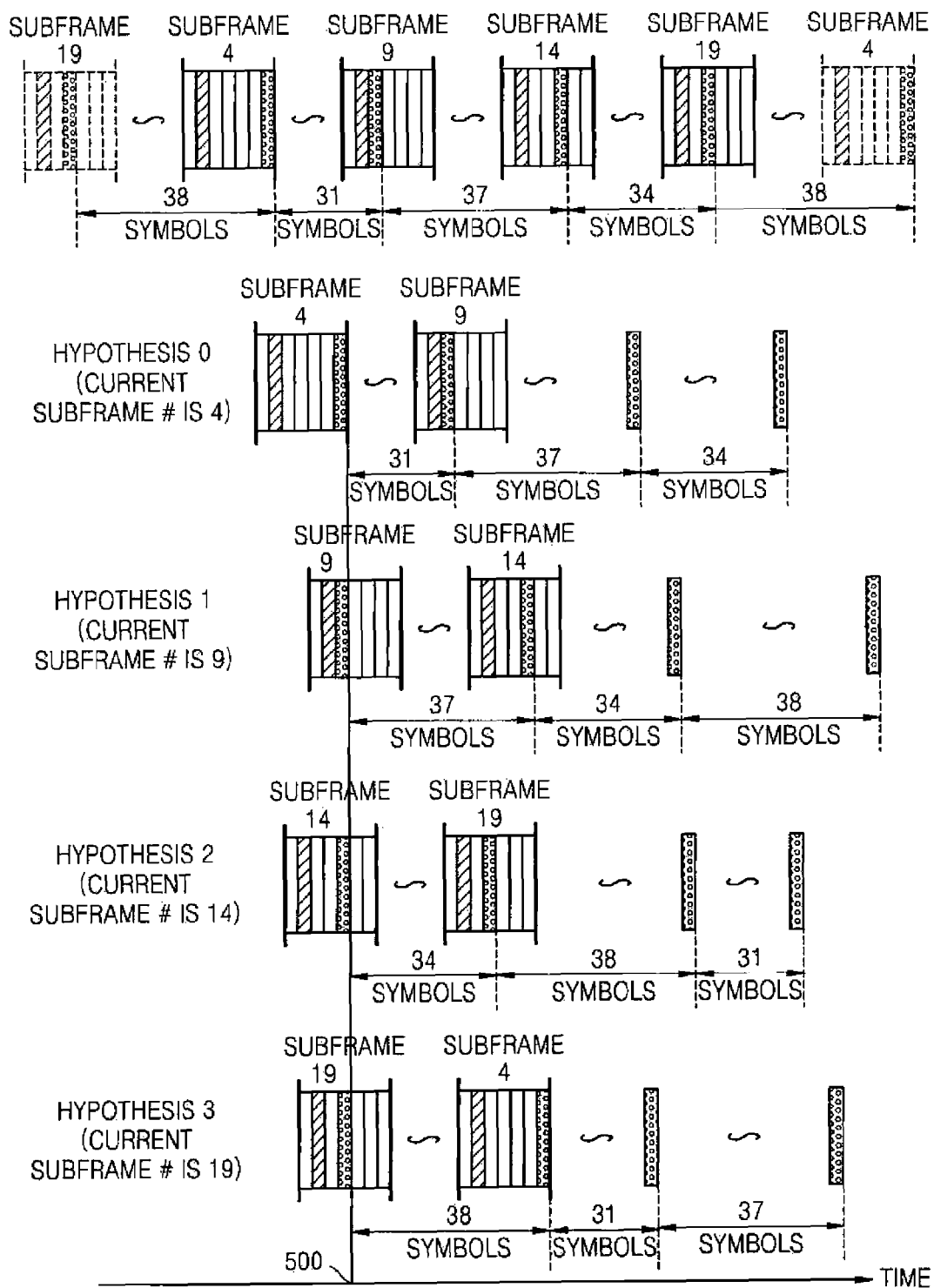
FIG. 5 is a conceptual diagram for explaining how a frame boundary of a mobile station is obtained according to another embodiment of the present invention.

FIG. 5 is a conceptual diagram for explaining how a frame boundary of a mobile station is obtained according to another embodiment of the present invention, specifically using the position modulation illustrated in FIG. 2A and the second method of obtaining a frame boundary.

The mobile station obtains a predetermined sync channel symbol timing 500 is using a sync channel symbol correlator or a differential correlator, and obtains a frame boundary using an interval between an adjacent sync channel symbol and the sync channel symbol timing 500. When the obtained sync channel symbol timing 500 is a sync channel symbol in a 4th sub-frame (hypothesis 0), the interval with the adjacent sync channel symbol is 31 symbols. When the obtained sync channel symbol timing 500 is a sync channel symbol in a 9th sub-frame (hypothesis 1), the interval with the adjacent sync channel symbol is 37 symbols. When the obtained sync channel symbol timing 500 is a sync channel symbol in a 14th sub-frame (hypothesis 2), the interval with the adjacent sync channel symbol is 34 symbols. When the obtained sync channel symbol timing 500 is a sync channel symbol in a 19th sub-frame (hypothesis 3), the interval with the adjacent sync channel symbol is 38 symbols.

A plurality of sync channel symbols may be used in order to increase cell search efficiency. That is, the intervals between the obtained sync channel symbol timing 500 and the adjacent sync channel symbol in each of hypotheses 0 through 3 are as follows.

Hypothesis 0==>37 34 38 31 37 . . .
    Hypothesis 1==>34 38 31 37 34 . . .
    Hypothesis 2==>38 31 37 34 38 . . .
    Hypothesis 3==>31 37 34 38 31 . . .

When the plurality of sync channel symbols are used in the second step of the cell search process, the probability of a false alarm can be reduced, and thus performance of the mobile station searching a cell can be improved.

As described above, the intervals between the obtained sync channel symbols timing 500 and the adjacent sync channel symbol are different in each hypothesis. The mobile station determines in which sub-frame the obtained sync channel symbol timing 500 exists by performing a test on hypotheses 0 through 3. Accordingly, a 10 msec frame boundary of a forward link signal received from a cell to which the current mobile station belongs can be obtained. Referring to FIG. 5, in hypothesis 0, the interval from the obtained sync channel symbol timing 500 to the frame boundary is a total of 105 (31+37+34+3) symbols, in hypothesis 1, it is 74 symbols (37+34+3), in hypothesis 2, it is 37 (34+3) symbols, and in hypothesis 3, it is 3 symbols.

Figure 6:
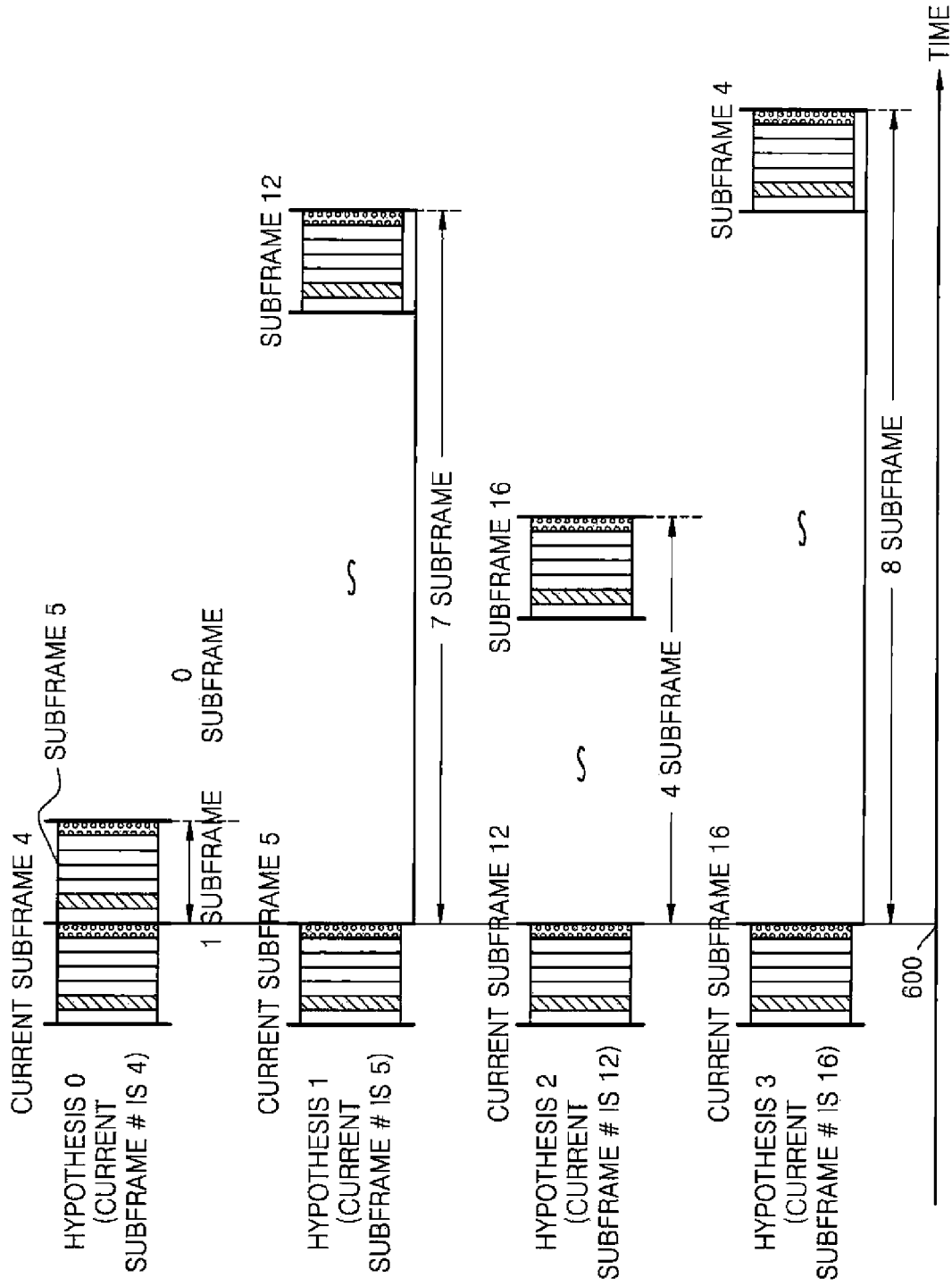
FIG. 6 is a conceptual diagram for explaining how a frame boundary of a mobile station is obtained according to another embodiment of the present invention.

FIG. 6 is a conceptual diagram for explaining how a frame boundary of a mobile station is obtained according to another embodiment of the present invention, specifically using the position modulation illustrated in FIG. 2B and the second method of obtaining a frame boundary.

The mobile station obtains a predetermined sync channel symbol timing 600 using a sync channel symbol correlator or a differential correlator, and obtains a frame boundary using an interval between an adjacent sync channel symbol and the sync channel symbol timing 600. When the obtained sync channel symbol timing 600 is a sync channel symbol in a 4th sub-frame (hypothesis 0), the interval with the adjacent sync channel symbol is 1 sub-frame. When the obtained sync channel symbol timing 600 is a sync channel symbol in a 9th sub-frame (hypothesis 1), the interval with the adjacent sync channel symbol is 7 sub-frames. When the obtained sync channel symbol timing 600 is a sync channel symbol in a 12th sub-frame (hypothesis 2), the interval with the adjacent sync channel symbol is 4 sub-frames. When the obtained sync channel symbol timing 600 is a sync channel symbol in a 19th sub-frame (hypothesis 3), the interval with the adjacent sync channel symbol is 8 sub-frames.

Similarly, a plurality of sync channel symbols can be used in order to increase cell search efficiency. By using the plurality of sync channel symbols in the second step of the cell search process, the probability of a false alarm can be reduced, and thus performance of the mobile station searching a cell can be improved.

As described above, the intervals between the obtained sync channel symbols timing 600 and the adjacent sync channel symbol are different in each hypothesis. The mobile station determines in which sub-frame the obtained sync channel symbol timing 600 exists by performing a test on hypotheses 0 through 3. Accordingly, a frame boundary of a forward link signal received from a cell to which the current mobile station belongs can be obtained.

Figure 7:
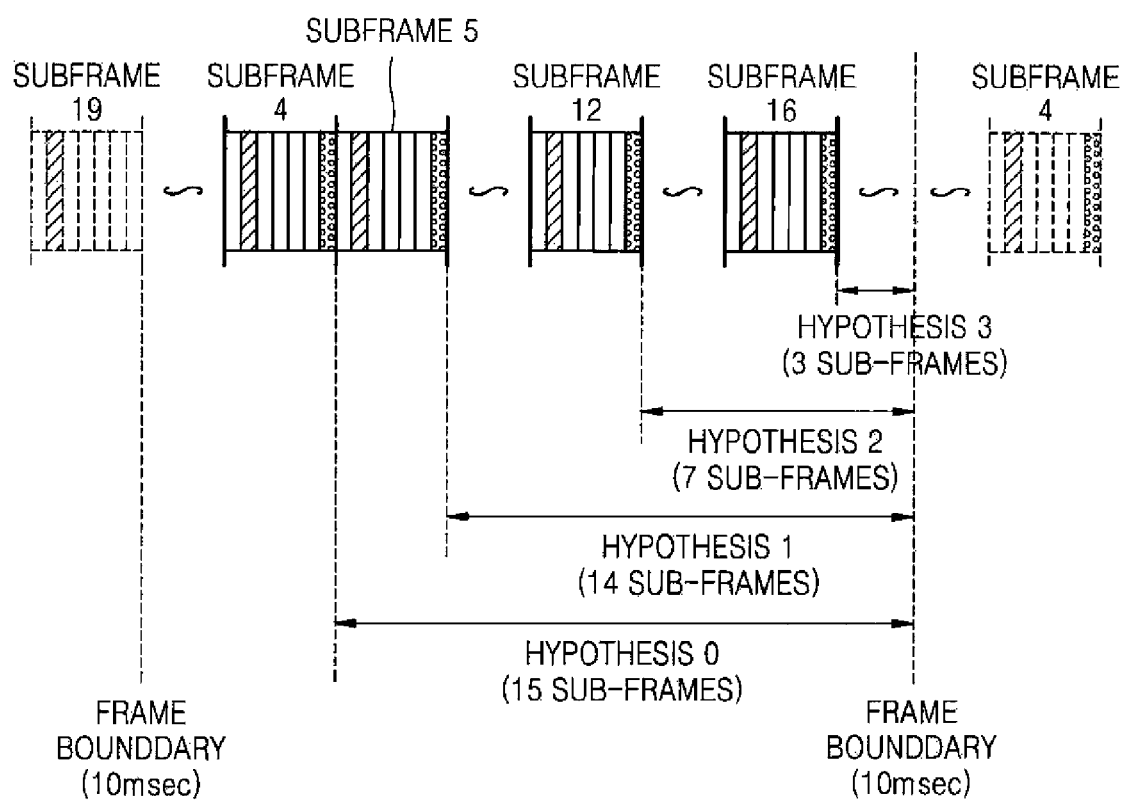
FIG. 7 illustrates an example of how a frame boundary is provided in each hypothesis illustrated in FIG. 6 when the position modulation illustrated in FIG. 2B is used.

FIG. 7 illustrates an example of how a frame boundary is provided in each hypothesis illustrated in FIG. 6 when the position modulation illustrated in FIG. 2B is used. Referring to FIG. 7, in hypothesis 0, an interval from the obtained sync channel symbol timing 600 to the frame boundary is a total of 15 sub-frames (i.e., 15×7 symbols), in hypothesis 1, it is 14 sub-frames (i.e., 14×7 symbols), in hypothesis 2, it is 7 sub-frames (i.e., 7×7 symbols), and in hypothesis 3, it is 3 sub-frames (i.e., 3×7 symbols).

In the methods of obtaining a frame boundary, the second step of the cell search process may further include detecting a code group in order for easier detection of a scrambling code in the third step of the cell search process. In this case, each base station sequence-hops each sync channel symbol to a hopping codeword corresponding to a code group to which its own scrambling code belongs. Accordingly, the cell search apparatus detects the code group by detecting the hopping codeword in the second step of the cell search process, and finally detects a scrambling code of a target cell by searching scrambling codes belonging to the detected code group in the third step of the cell search process.

Figure 8:
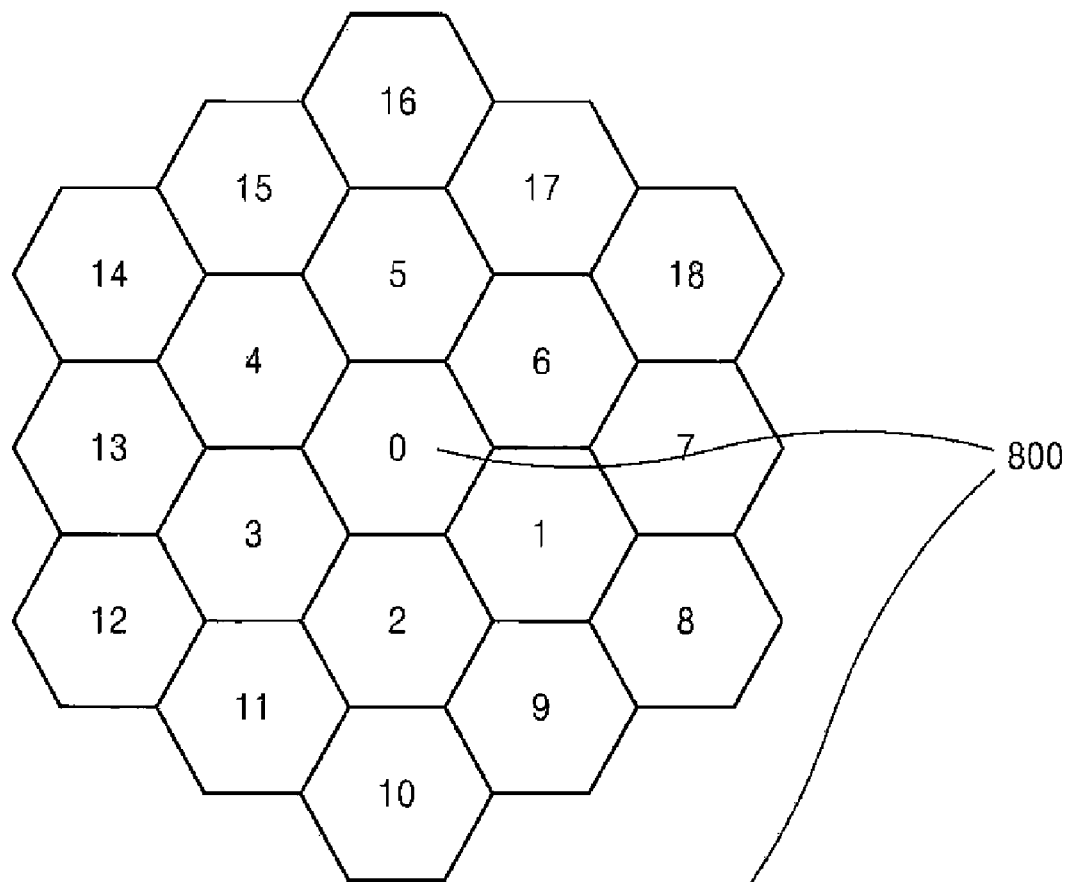
FIG. 8 is a conceptual diagram for explaining how to group scrambling codes according to an embodiment of the present invention.

FIG. 8 is a conceptual diagram for explaining how to group scrambling codes according to an embodiment of the present invention.

A scrambling code or scrambling code identifier 800 used to scramble common pilot channel symbols or data symbols is assigned to each base station belonging to an OFDM cellular system. In particular, the OFDM cellular system according to an embodiment of the present invention groups the scrambling codes into code groups. That is, at least one scrambling code identifier exists in each code group. Referring to FIG. 8, the number of scrambling codes used in the OFDM cellular system is at least 19, and the number of code groups is at least 3. Thus, each of the code groups contains 4 scrambling code identifiers 800 or scrambling codes. In particular, if each code group contains only one scrambling code, code groups respectively correspond to scrambling codes, and thus a hopping codeword can specify not only a code group but also a scrambling code.

Referring to FIG. 8, code group 0, i.e. a code group wherein a code group identifier is 0, includes a scrambling code identifier 0, scrambling code identifier 1, scrambling code identifier 2, and scrambling code identifier 3. The same can be described for code groups 1, 2, and 3.

In order to identify each cell, the OFDM symbols excluding the sync channel symbol are multiplied by a unique scrambling code of each cell in a frequency domain. Referring to FIG. 8, a base station in charge of a middle cell uses scrambling code 0 in order to perform scrambling on the OFDM symbols excluding the sync channel symbol, and sequence-hops each sync channel symbol using a hopping codeword corresponding to code group 0. The details will be described later.

Figure 9A:
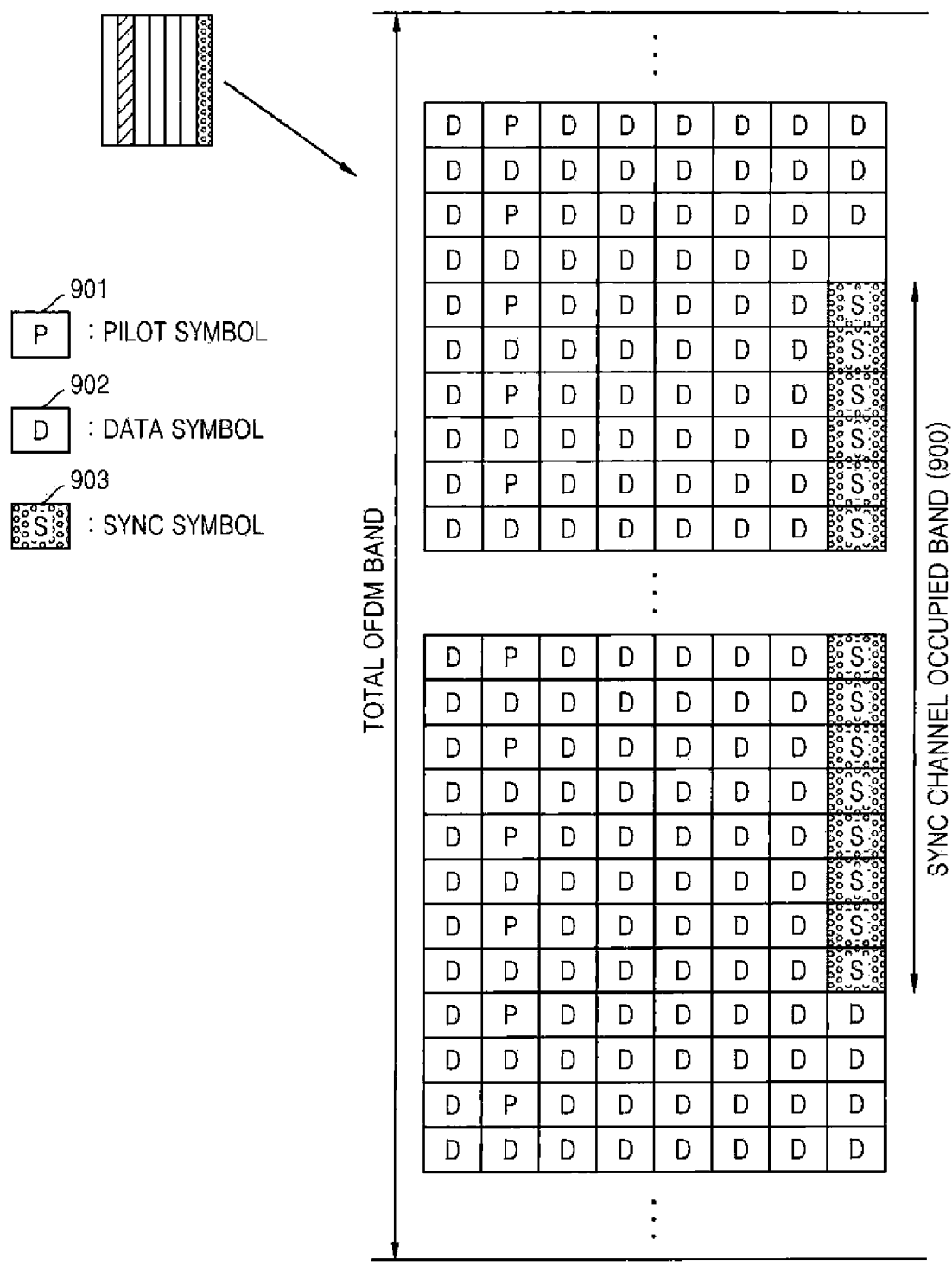
FIGS. 9A through 9C each illustrates a sub-frame containing a sync channel symbol according to embodiments of the present invention.
Figure 9B:
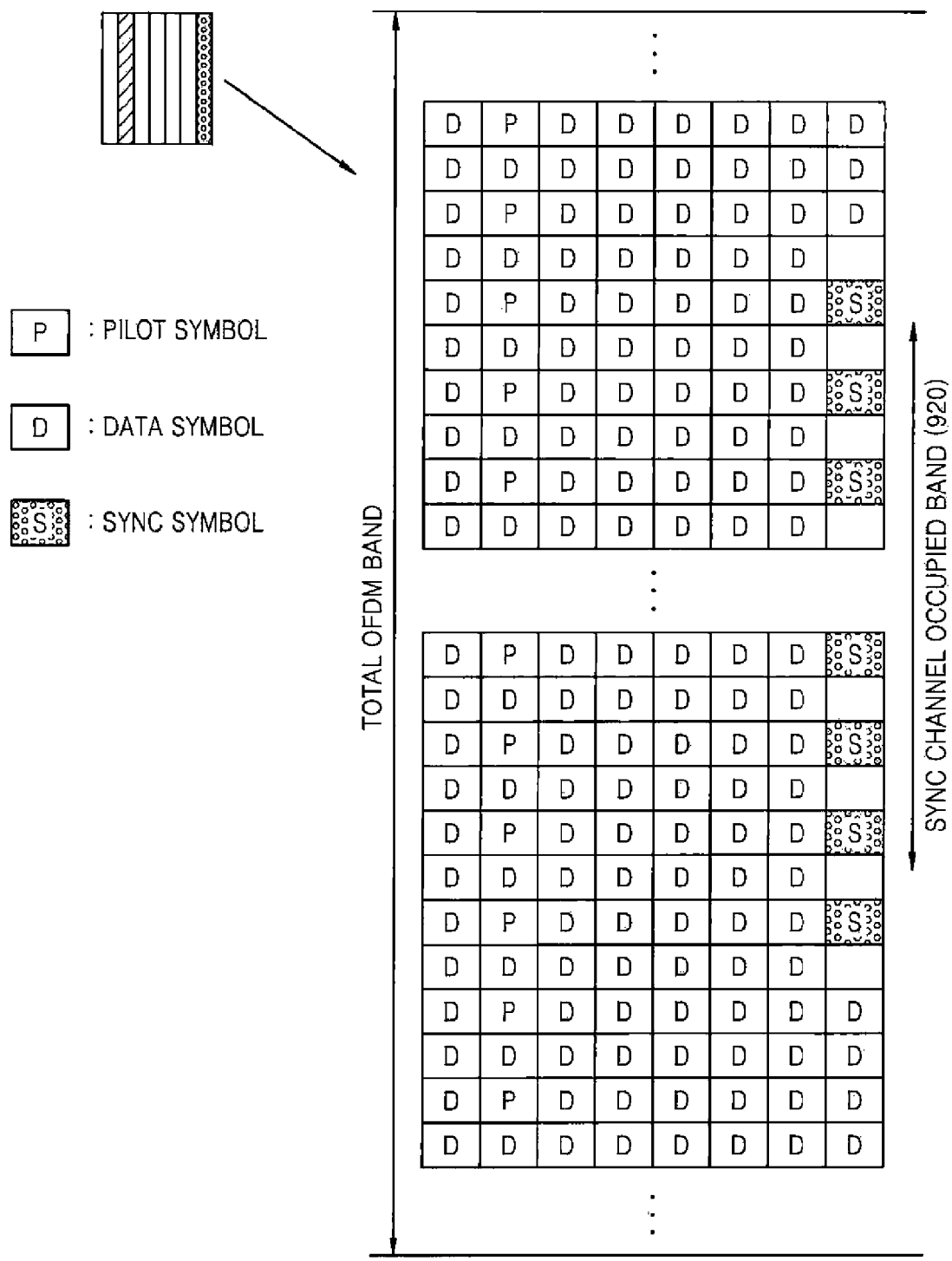
Figure 9C:
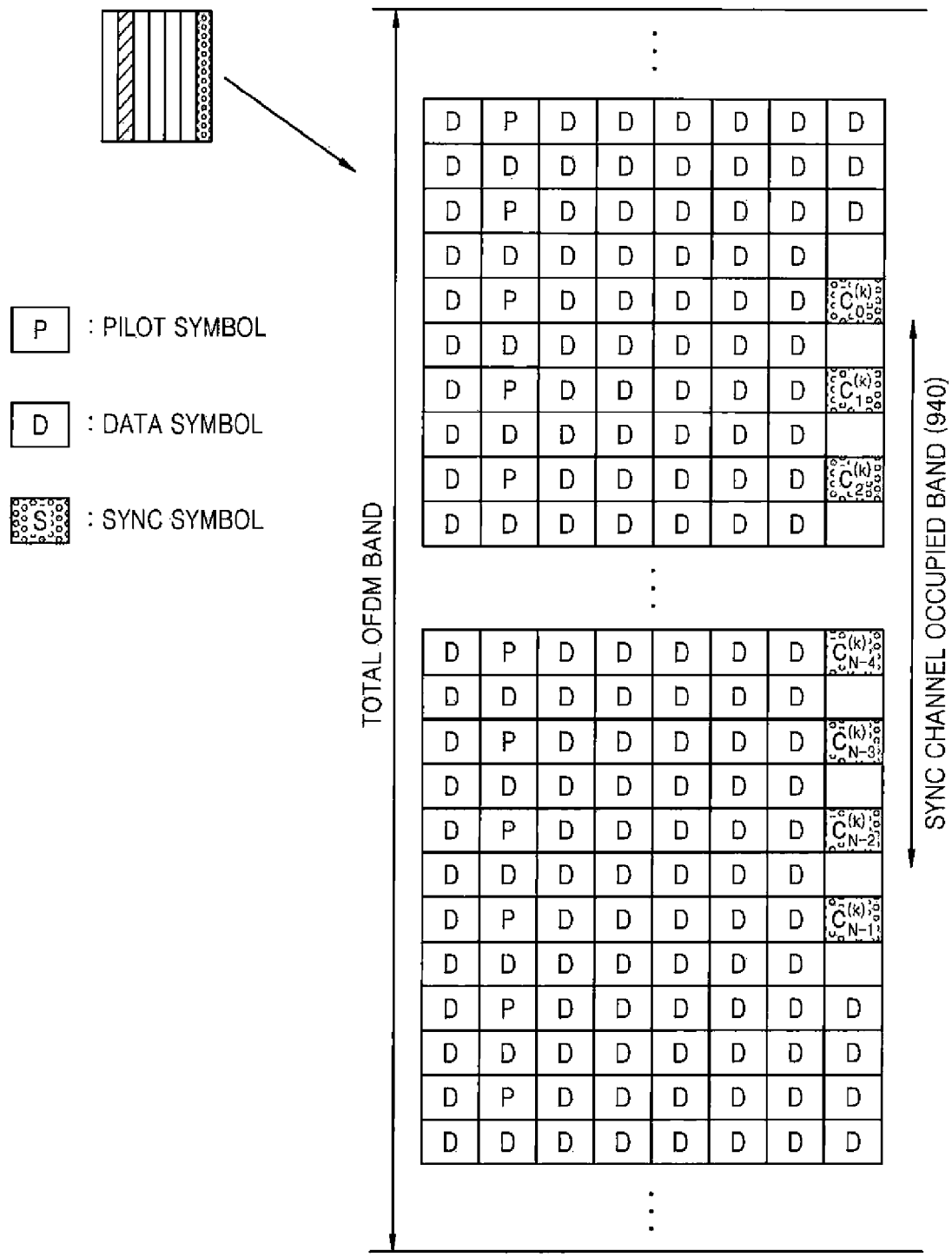

FIGS. 9A through 9C each illustrates a sub-frame containing a sync channel symbol according to embodiments of the present invention, for example, the last sub-frame of the first sync block illustrated in FIG. 1.

FIGS. 9A and 9B illustrate embodiments when each cell uses sync channel symbols having the same form, and FIG. 9C illustrates an embodiment when cells belonging to different code groups use sync channel symbols having different forms. Also, FIG. 9A illustrates an embodiment when all subcarriers in the sync channel occupied band are used, and FIGS. 9B and 9C illustrates embodiments when half of the subcarriers in the sync channel occupied band are used.

Referring to FIG. 9A, a sync channel uses the last OFDM symbol from among 7 OFDM symbols belonging to a sub-frame, and subcarriers belonging to a sync channel occupied band 900 contain sync symbol 903. Pilot symbol 901 and data symbol 902 are contained in the second symbol, and the data symbol 902 is contained in the remaining symbols. Here, the pilot symbol 901, the data symbol 902, and the sync symbol 903 may have complex-values.

According to the structure of the sub-frame illustrated in FIG. 9A, all base stations use the same sync symbol 903, and a cell search apparatus, such as a mobile station, obtains sync channel symbol timing by means of a correlation calculation while having information about the sync symbol 903 in the first step of the cell search process. Then, the cell search apparatus detects a frame boundary using the interval pattern of sync channel symbols described above in the second step of the cell search process, and detects a scrambling code of a target cell by performing a pilot correlation on a common pilot channel symbol in the third step of the cell search process. That is, the common pilot channel is not only used in estimating a channel for coherent modulation of a data channel of a forward link but also used in detecting a scrambling code or a scrambling code identifier in the third step of the cell search process. The details will be described later.

The structure of the sub-frame illustrated in FIG. 9B is different from the structure of the sub-frame illustrated in FIG. 9A, in that only half subcarriers belonging to a sync channel occupied band 920 are used. That is, even-th or odd-th subcarriers from among the subcarriers belonging to the sync channel occupied band 920 of the last OFDM symbol contain sync symbol. The remaining subcarriers contain null data, such as '0'.

Similarly, based on the structure of the sub-frame illustrated in FIG. 9B, all base stations use the same sync symbol, and a mobile station performs the first, second, and third steps of the cell search process described in FIG. 9A. However, in the current embodiment of the present invention, sync channel symbol timing can be obtained using a time domain repetition pattern of sync channel symbols originated from using only half subcarriers from among the subcarriers belonging to the sync channel occupied band 920 in the first step of the cell search process. That is, a method of obtaining sync channel symbol timing using the time domain repetition pattern can be performed using a differential correlator, which will be described later.

The structure of the sub-frame illustrated in FIG. 9C is different from the structure of the sub-frame illustrated in FIG. 9B, in that data loaded on subcarriers belonging to a sync channel occupied band 940 is sync channel sequence element data of a hopping codeword. That is, a sync channel sequence mapped to index values of each element of the hopping codeword is assigned to each of the sync channel symbols. Also, each of the subcarriers belonging to the sync channel occupied band 940 is loaded with data values, which are elements of the assigned sync channel sequence.

According to the structure of the sub-frame illustrated in FIG. 9C, base stations belonging to different code groups use different hopping codewords, and accordingly, use different sync symbol. Also, a mobile station performs the first, second, and third steps of the cell search process as described in FIG. 9B. However in the current embodiment, a code group is detected by detecting hopping codeword information of a target cell in the second step of the cell search process, and a scrambling code of a target cell can be detected by searching scrambling codes belonging to the detected code group in the third step of the cell search process.

As a method of assigning the sync channel occupied bandwidth, a sync channel can occupy a band, which remains, by excluding a guard band as illustrated in FIG. 9A, or by occupying a portion of the remaining band. An example of a system to which the latter method can be applied is a system which must support a scalable bandwidth, such as a $3^{rd}$ Generation Long Term Evolution (3G-LTE) system. That is, a mobile station using only 1.25 MHz, a mobile station using only 2.5 MHz, and all mobile stations using 5 MHz, 10 MHz, 15 MHz, and 20 MHz can acquire sync with a base station system when sync channel occupies only a portion of a total system bandwidth as illustrated in FIGS. 9A through 9C. For example, when the system bandwidth is 20 MHz, only 1.25 MHz in the center, which remains due to the exclusion of a DC subcarrier, is used.

A cell search unit of a mobile station, which will be described later, can increase cell search performance by performing filtering so as to pass only a sync channel occupied band.

Referring to FIGS. 9B and 9C, the sync symbol can be loaded on one of 2 adjacent subcarriers, and a predetermined value can be loaded on the remaining subcarrier. Here, an example of the predetermined value may be '0', which corresponds to null data. Based on the embodiments illustrated in FIGS. 9B and 9C, a time domain signal of a sync channel symbol excluding a cyclic prefix has a pattern that is repeated in the time domain.

In FIG. 9C, $C^{(k)}=[c_0^{(k)}, c_1^{(k)}, c_2^{(k)}, \ldots, c_{N-1}^{(k)}]$ indicates a sync channel sequence in which a hopping codeword element corresponding to a relevant sync channel symbol is k. Each element of the sync channel sequence, i.e., $c_0^{(k)}, c_1^{(k)}, c_2^{(k)}, \ldots, c_{N-1}^{(k)}$, has a value of a complex number. An arbitrary sequence can be used as the sync channel sequence. For example, a Generalized Chirp Like (GCL) sequence defined using Equation 1 can be used as the sync channel sequence.

$$c_n^{(k)} = \exp\left\{-j2\pi k \frac{n(n+1)}{2N}\right\}, \tag{1}$$
$$n = 0, 1, \ldots, N-1, k = 1, 2, \ldots, N-1$$

In Equation 1, k is defined as an index of an arbitrary element of a hopping codeword and denotes a sync channel sequence number, $c_n^{(k)}$ denotes an $n^{th}$ element of a $k^{th}$ sync channel sequence, N denotes the length of the GCL sequence. In particular, in the GCL sequence, each code length N is a prime number, and a total of N−1 sequences exist. That is, if the GCL sequence is used, a GCL sequence set used in a system consists of N−1 GCL sequences. The number of GCL sequences is the same as a code alphabet size of a hopping code.

A hopping codeword assigned to each base station is transmitted to a mobile station in the form of sync channel sequence hopping of a forward link frame. That is, in an embodiment of the present invention, the base station maps hopping codeword elements of which is a GCL sequence index to respective sync channel symbols, and transmits the sync channel symbols to a mobile station, which allows the mobile station to detect a hopping codeword included in the sync channel symbols transmitted from a target base station. Here, an example of the target base station can be a base station for which the mobile station initially searches or an adjacent base station to be searched so as to allow handover to occur.

Table 1 is a table illustrating a set of sync channel hopping patterns of code groups, i.e., a set of hopping codewords, in a case where the number of code groups is 3 and the number of sync channel symbols in a forward link frame is 4, wherein Table 1 is used to perform the embodiment illustrated in FIG. 9C. That is, the 3 hopping patterns can be represented using hopping codewords, each having a length of 4, and the length of each hopping codeword is the same as the number of sync channel symbols per 10-msec frame. An entire set of hopping codewords is defined as a hopping code. Each base station uses the same sync channel hopping pattern (hopping codeword) for every frame, and base stations having different group numbers use different hopping codewords. Referring to Table 1, each hopping codeword consists of 4 hopping codeword elements and each hopping codeword respectively corresponds to a code group identifier.

TABLE 1

| Hopping Codeword | Code Group ID |
| --- | --- |
| 3, 6, 9, 12 | 0 |
| 1, 4, 7, 10 | 1 |
| 2, 5, 8, 11 | 2 |

In Table 1, an alphabet size of a hopping code sequence is 40. That is, a hopping codeword element k transmitted through each sync block is one of numbers 1 to 40. For example, if a scrambling code identifier of a current base station is 2, the current base station belongs to a code group No. 0 (referring to FIG. 2), and a hopping codeword assigned to the code group No. 0 is {2, 5, 8, 11} (referring to Table 1). Thus, 4 sync channel symbols transmitted through each frame by the current base station respectively have hopping codeword elements of 2, 5, 8, and 11, and values defined by Equation 1 according to the hopping codeword element k are assigned to a subcarrier used by each of the 4 sync channel symbols. In particular, FIG. 1 shows an illustration of a case where a code group identifier of the current base station is 0.

Figure 10:
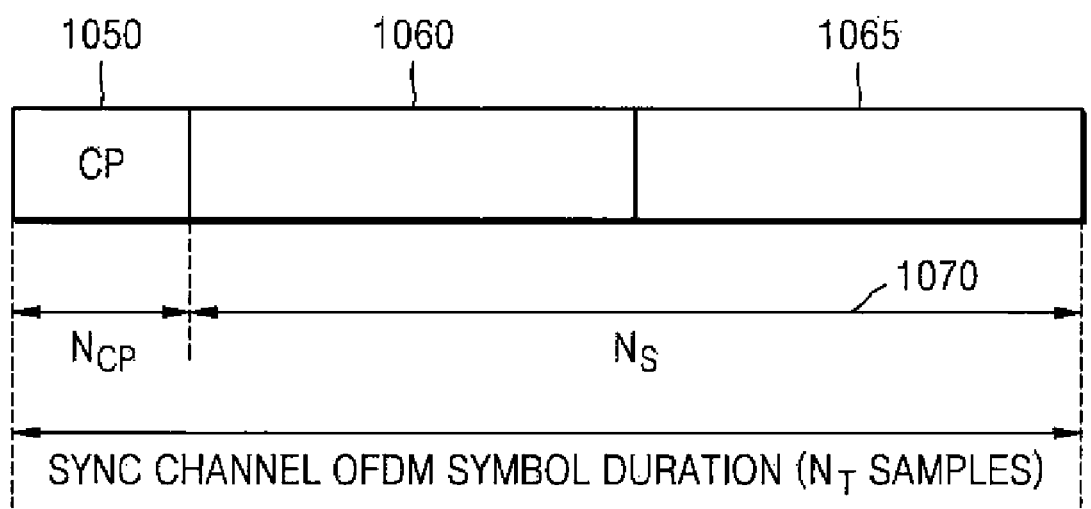
FIG. 10 illustrates a structure of a sync channel symbol in the time domain according to an embodiment of the present invention.

FIG. 10 illustrates a structure of a sync channel symbol in the time domain according to an embodiment of the present invention.

Referring to FIG. 4, $N_T$ denotes the number of samples of the entire sync channel OFDM symbol duration, $N_{CP}$ denotes the number of samples of a cyclic prefix (CP) duration 1050, and $N_S$ denotes the number of samples of a symbol duration 1070 excluding the CP duration 1050. In particular, if the sync channel symbol uses only odd-th or even-th subcarriers in a sync channel occupied band for transmission of a relevant sync channel sequence and the sync channel symbol allocates a predetermined value (e.g., 0) to remaining subcarriers, a first duration 1060 and a second duration 1065 forming the duration denoted by reference numeral 1070 have a specific pattern. If the sync channel symbol uses DC component subcarriers, the first duration 1060 and the second duration 1065 have the same waveform in a time domain signal of a transmitter end, and if the sync channel symbol does not use the DC component subcarriers, the second duration 1065 has a waveform 180° phase reversed from a waveform of the first duration 1060. By using this time domain repetition pattern of the sync channel symbol, sync can be acquired with a simple structure using a differential correlation operation, which will be described later in detail. The first duration 1060 and the second duration 1065 may also be symmetrical to each other. In this case, reverse differential correlation can be used. The differential correlation and the reverse differential correlation used in a sync acquisition process are within the spirit and scope of the present invention.

A base station transmits frame boundary information, loaded on a sync channel, to a mobile station inside a cell through position modulation of a sync channel symbol. Moreover, the base station can transmit each element of a sync channel sequence, specifying a code group to a subcarrier of a sync channel symbol, to the mobile station. In this case, the mobile station not only obtains the frame boundary, but also the code group using the sync channel.

Figure 11:
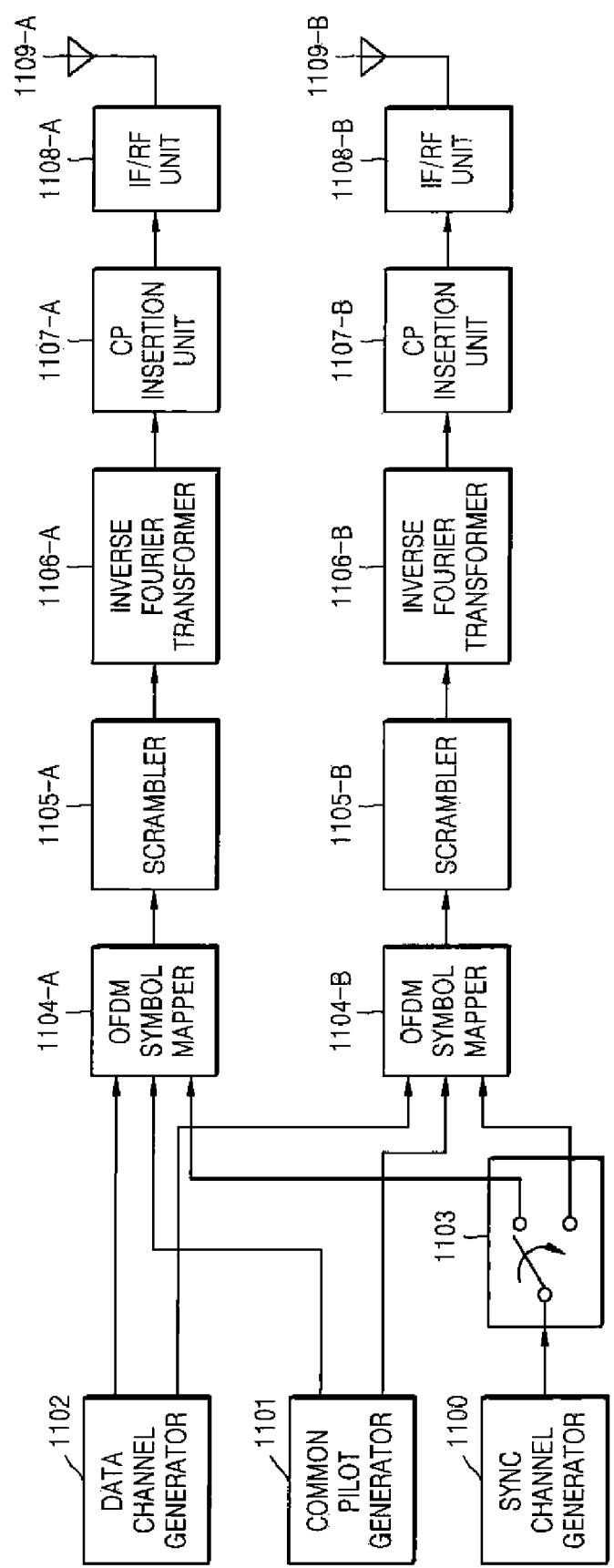
FIG. 11 is a block diagram of a base station according to an embodiment of the present invention.

FIG. 11 is a block diagram of a base station according to an embodiment of the present invention. Referring to FIG. 11, the base station includes a sync channel generator 1100, a common pilot channel generator 1101, a data channel generator 1102, a diversity controller 1103, OFDM symbol mappers 1104-A and 1104-B, scramblers 1105-A and 1105-B, inverse Fourier transformers 1106-A and 1106-B, CP insertion units 1107-A and 1107-B, intermediate frequency/radio frequency (IF/RF) units 1108-A and 1108-B, and transmission antennas 1109-A and 1109-B.

The data channel generator 1102 generates data symbol and the common pilot channel generator 1101 generates pilot symbol.

The sync channel generator 1100 generates a sync channel sequence corresponding to each element of a hopping codeword assigned to the base station. That is, if the hopping codeword assigned to the base station is {2, 5, 8, 11}, the sync channel generator 1100 generates a sequence, i.e. N elements, obtained by substituting k=2 into Equation 1 for a first sync block. If the number of frequency domain subcarriers which a sync channel symbol can use for transmission of a relevant sync channel sequence is carried is less than N, e.g., if N=41 and the number of subcarriers occupied by the sync channel sequence is 38, the last 3 elements of the sync channel sequence defined using Equation 1 are not transmitted. Specifically, the sync channel generator 1100 provides the sync channel sequence to the OFDM symbol mappers 1104-A and 1104-B at the time the sync channel is located, so that position modulation of the sync channel can be performed.

Each of the OFDM symbol mappers 1104-A and 1104-B maps data values of the data channel, the pilot channel, and the sync channel to positions in the frequency domain as illustrated in FIGS. 9A through 9C. Each of the scramblers 1105-A and 1105-B multiplies an output of each of the OFDM symbol mappers 1104-A and 1104-B, i.e., OFDM symbols excluding a sync channel symbol from the mapping result, by a base station's unique scrambling code in the frequency domain.

Each of the inverse Fourier transformers 1106-A and 1106-B generates a time domain signal by performing an inverse Fourier transform on the output of each of the scramblers 1105-A and 1105-B.

Each of the CP insertion units 1107-A and 1107-B inserts a CP for enabling demodulation of an OFDM signal, even with a channel multi-path delay, into the output of each of the inverse Fourier transformers 1106-A and 1106-B. Each of the IF/RF units 1108-A and 1108-B up-converts an output signal of each of the CP insertion units 1107-A and 1107-B, which is a baseband signal, to a band pass signal and amplifies the up-converted signal.

Each of the transmission antennas 1109-A and 1109-B transmits the amplified signal.

In FIG. 11, the number of transmission antennas 1109-A and 1109-B is 2. That is, if the base station according to an embodiment of the present invention has only one transmission antenna 1109-A without the transmission antenna 1109-B, the OFDM symbol mapper 1104-B, the scrambler 1105-B, the inverse Fourier transformer 1106-B, the CP insertion unit 1107-B, the IF/RF unit 1108-B, and the diversity controller 1103 can be omitted.

FIG. 11 illustrates a case where sync channel symbols are transmitted while achieving transmission diversity using 2 transmission antennas at a transmitter end of the base station. The transmission diversity using the diversity controller 1103 illustrated in FIG. 11 will now be described. Sync channel symbols belonging to adjacent sync blocks are transmitted through different transmission antennas in order to achieve spatial diversity. For example, a sync channel symbol belonging to a first sync block is transmitted through the first transmission antenna 1109-A, a sync channel symbol belonging to a second sync block is transmitted through the second transmission antenna 1109-B, and a sync channel symbol belonging to a third sync block is transmitted through the first transmission antenna 1109-A. This switching so as to achieve the spatial diversity is performed by the diversity controller 1103.

That is, using a method of applying Time Switching Transmit Diversity (TSTD) to the sync channel, the diversity controller 1103 provides an output of the sync channel generator 1100 to the OFDM symbol mapper 1104-A or 1104-B by switching the output of the sync channel generator 1100.

Besides the spatial diversity or the TSTD diversity, delay diversity can be used as the transmission diversity.

Figure 12A:
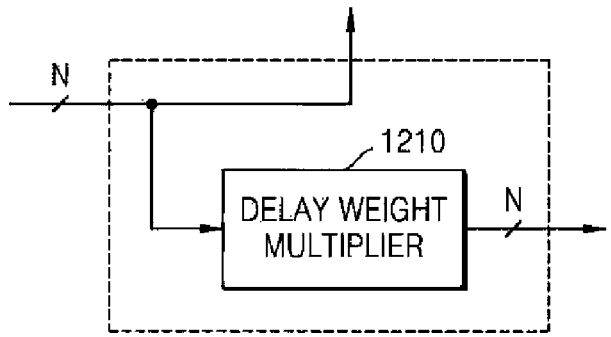
FIGS. 12A and 12B are a block diagram and a conceptual diagram, respectively, of a diversity controller in a case where delay diversity is applied to the base station illustrated in FIG. 11, according to an embodiment of the present invention.
Figure 12B:
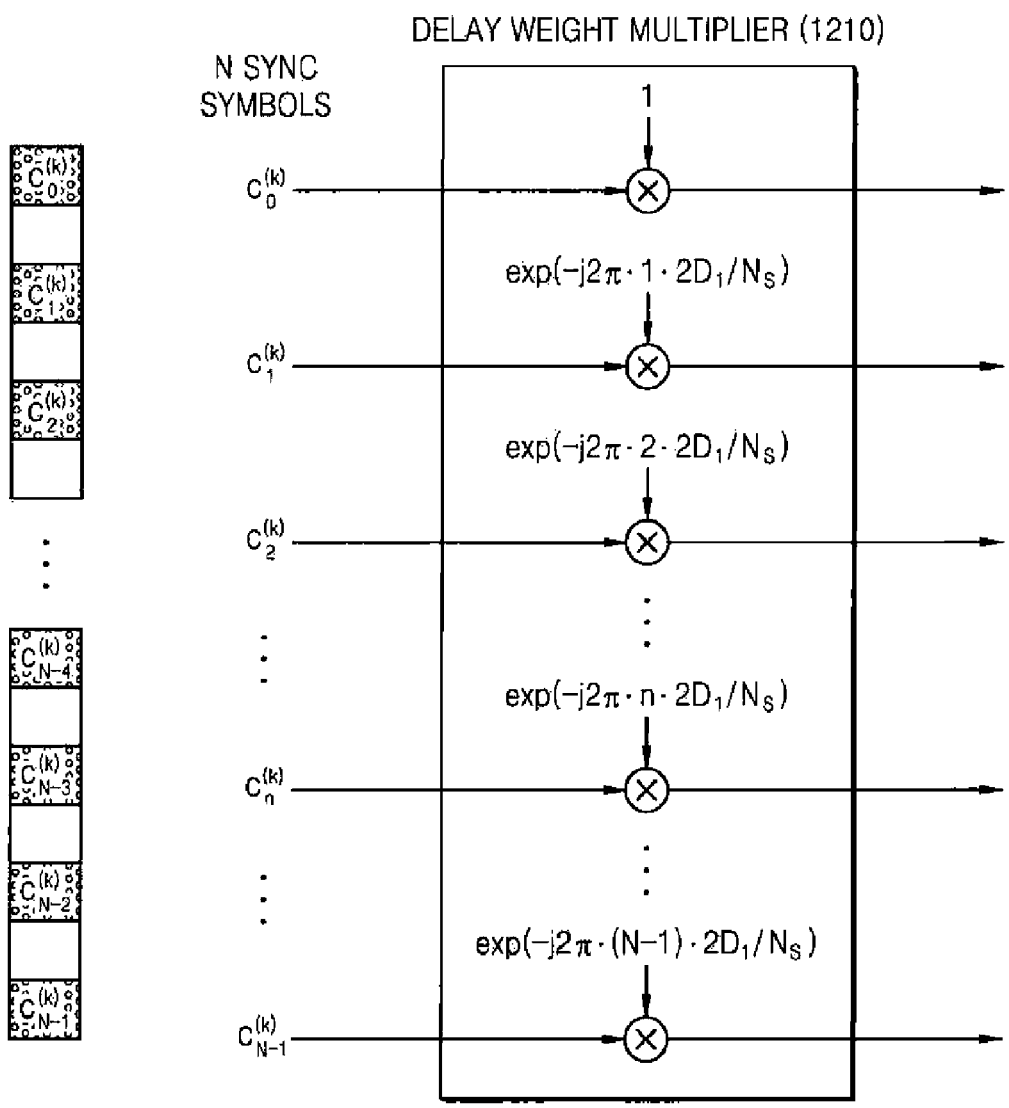

FIGS. 12A and 12B are a block diagram and a conceptual diagram, respectively, of a diversity controller 1103 in a case where delay diversity is applied to the base station illustrated in FIG. 11, according to an embodiment of the present invention.

Referring to FIG. 12A, the diversity controller 1103 includes a delay weight multiplier 1210. N sync symbols are generated at every sync channel symbol by the sync channel generator 1100 illustrated in FIG. 11. The generated sync symbols are separated into two data paths. According to the upper data path, the sync symbols are directly provided to the OFDM symbol mapper 1104-A. According to the lower data path, the sync symbols are input to the delay weight multiplier 1210, and the output of the delay weight multiplier 1210 is input to the OFDM symbol mapper 1104-B.

FIG. 12B is a conceptual diagram for explaining an operation of the delay weight multiplier 1210 of FIG. 12A.

Referring to FIG. 12B, the delay weight multiplier 1210 delays the generated sync symbols and includes N multipliers.

Each of the N multipliers multiplies each sync symbol assigned to each subcarrier used by a sync channel symbol, i.e., each of the N pieces of generated sync symbol, by a weight. A weight w(n) multiplied by sync symbol assigned to an $n^{th}$ subcarrier used by the sync channel symbol is calculated using Equation 2.

$$w(n)=\exp(-j2\pi n \cdot 2D_m/N_s), n=0, 1, 2, \ldots, N-1 \quad (2)$$

In Equation 2, $D_m$ denotes a delay of an FFT sample unit in the time domain for an $m^{th}$ transmission antenna, and $N_s$ denotes the number of FFT samples. Since it is assumed, as illustrated in FIG. 9C, that sync symbol is carried on every other subcarrier, $2D_m$ is used instead of $D_m$. If the number of transmission antennas 1109-A and 1109-B is 2 as illustrated in FIG. 11, a delay to the first transmission antenna 1109-A is $D_0=0$, and a delay to the second transmission antenna 1109-B is $D_1$.

The mobile station's cell search process according to an embodiment of the present invention is accomplished in 3 steps. The first step is a sync acquisition step, the second step is a step of detecting a code group and a frame boundary based on a sync block boundary acquired in the first step, and the third step is a step of detecting a scrambling code identifier or a scrambling code of a current cell to which a mobile station belongs using the frame boundary and code group information acquired in the second step. In particular, in the second step of the cell search process, frequency offset estimation can be further included in order to increase a cell search's probability of success. In addition, after the third step of the cell search process, a fine timing/fine frequency detection step can be further performed.

Figure 13:
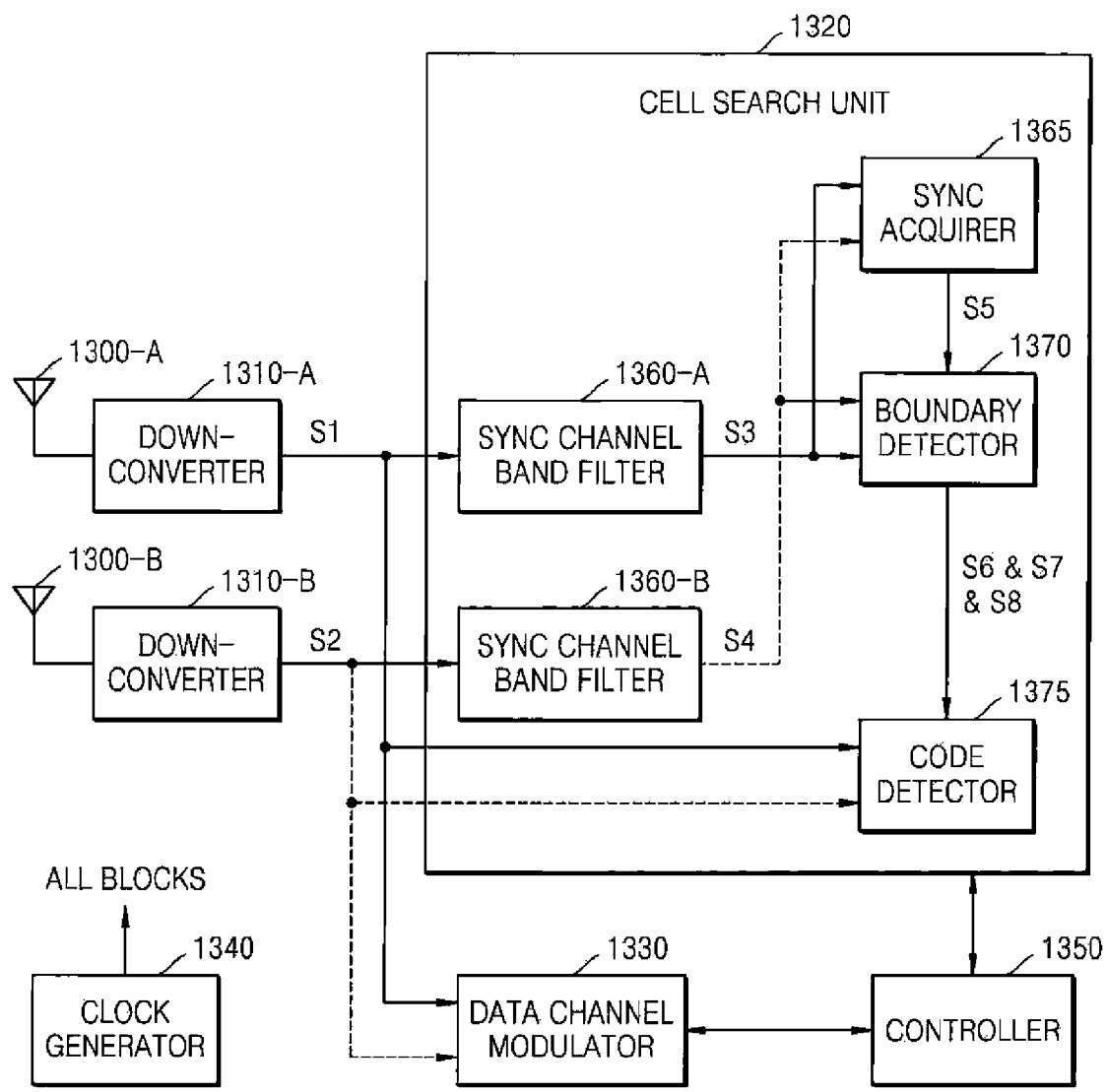
FIG. 13 is a block diagram of a receiver of a mobile station according to an embodiment of the present invention.

FIG. 13 is a block diagram of a receiver of a mobile station according to an embodiment of the present invention. The mobile station has at least one reception antenna, and FIG. 13 illustrates a case where the mobile station has 2 reception antennas.

Referring to FIG. 13, the receiver of the mobile station includes reception antennas 1300-A and 1300-B, down-converters 1310-A and 1310-B, a cell search unit 1320, a data channel demodulator 1330, a controller 1340, and a clock generator 1350.

RF signal type forward link frames transmitted from base stations are received through the reception antennas 1300-A and 1300-B and converted to baseband signals S1 and S2 by the down-converters 1310-A and 1310-B.

The cell search unit 1320 searches for a target cell using a sync channel symbol and a common pilot channel symbol included in the down-converted signals S1 and S2. As a result of the cell search, sync channel symbol timing, a frame boundary, and a scrambling code of the target cell can be detected, and the target cell is, for example, searched for when the mobile station searches an initial cell at the first time or an adjacent cell, so as to allow handover to occur.

The controller 1340 controls the cell search unit 1320 and the data channel demodulator 1330. That is, the controller 1340 controls timing and descrambling of the data channel demodulator 1330 based on a cell search result acquired by controlling the cell search unit 1320. The data channel demodulator 1330 demodulates data symbol illustrated in FIGS. 9A through 9C, included in the down-converted signals S1 and S2 under control of the controller 1340. All the hardware in the mobile station operates by being synchronized with a clock generated by the clock generator 1350.

Referring to FIG. 13, the cell search unit 1320 includes sync channel band filters 1360-A and 1360-B, a sync acquirer 1365, a boundary detector 1370, and a code detector 1375.

The sync channel band filters 1360-A and 1360-B perform band pass filtering in order to pass only the sync channel occupied band from among the entire OFDM signal band as described in FIGS. 9A through 9C, with respect to the down-converted signals S1 and S2.

The sync acquirer 1365 acquires sync information S5 using a sync channel symbol included in the filtered signals S3 and S4.

The boundary detector 1370 detects frame boundary information S6 using the acquired sync information S5 and pre-stored interval information between sync channel symbols. Specifically, when the sync channel symbols are sequence-hopped to sync channel sequence specifying a code group, the boundary detector 1370 detects code group information S7 based on the acquired sync information S5 and pre-stored information of Table 1.

The boundary detector 1370 can increase detection performance by performing frequency offset estimation and compensation before detecting the code group identifier and frame timing. In this case, an estimated frequency offset value S8 can be provided to the code detector 1375.

The code detector 1375 acquires position of the common pilot channel symbol based on the detected frame boundary information S6, and detects a scrambling code by means of a pilot correlation of the common pilot channel symbol included in the down-converted signals S1 and S2. Specifically, when the detected code group information S7 is provided form the boundary detector 1370, the code detector 1375 can search only scrambling codes belonging to the detected code group.

Although the common pilot channel symbol is extracted from the down-converted signals S1 and S2 as illustrated in FIG. 13, if the common pilot channel symbol is not influenced by the sync channel band filters 1360-A and 1360-B, the common pilot channel symbol can be extracted from the outputs S3 and S4 of the sync channel band filters 1360-A and 1360-B. In detail, the code detector 1375 extracts the common pilot channel symbol by obtaining a position of the common pilot channel symbol based on the detected frame timing, calculates correlation values between the extracted common pilot channel symbol and scrambling codes corresponding to scrambling code identifiers belonging to the detected code group selected from among pre-stored scrambling code identifiers, and detects a scrambling code identifier used by a current base station based on the correlation calculation result.

Figure 14A:
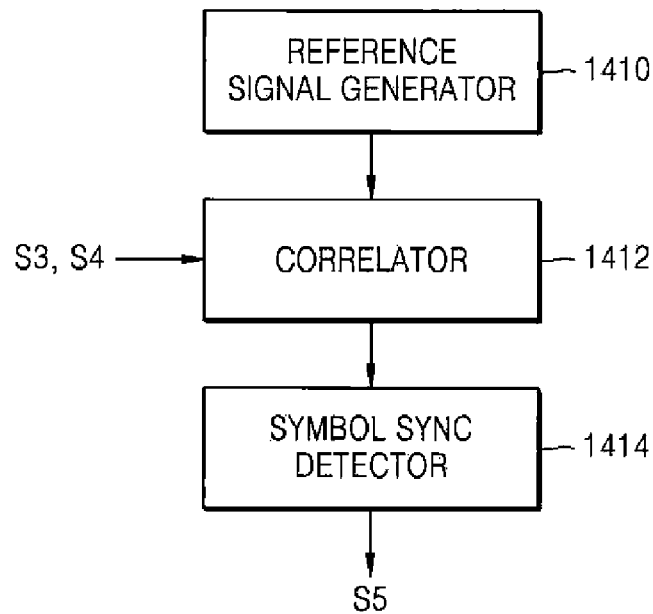
FIGS. 14A and 14B are each a block diagram of a sync acquirer of the receiver illustrated in FIG. 13, according to embodiments of the present invention.
Figure 14B:
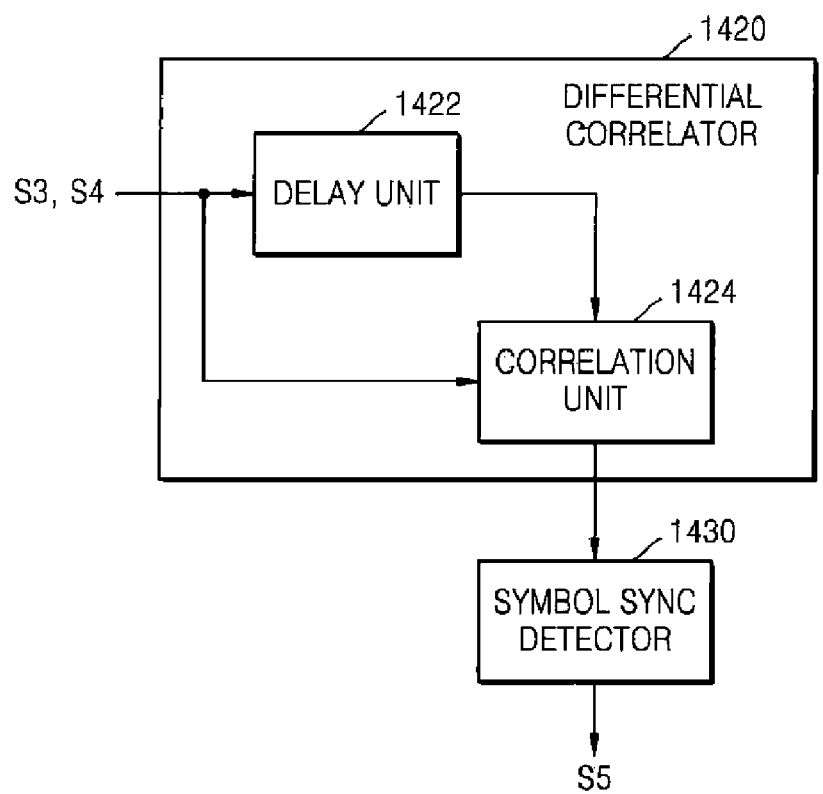

FIGS. 14A and 14B are each a block diagram of a sync acquirer 1365 of the receiver illustrated in FIG. 13, according to embodiments of the present invention.

Referring to FIG. 14A, the sync acquirer 1365 according to the an embodiment of the present invention includes a reference signal generator 1410, a correlator 1412, and a symbol sync detector 1414. The reference signal generator 1410 generates a sync channel symbol in the time domain. That is, the reference signal generator 1410 generates a signal in the time domain for each sync channel symbol illustrated in FIGS. 9A through 9C.

The correlator 1412 calculates correlation values between each sample position of a received signal and the generated reference signal, and the symbol sync detector 1414 detects a sample position having the maximum correlation value as a symbol synchronization S5, i.e. as an acquired sync channel symbol timing. Here, the received signal corresponds to the filtered signals S3 and S4 as illustrated in FIG. 13.

Referring to FIG. 14B, the sync acquirer 1365 according to another embodiment of the present invention includes a differential correlator 1420 and a symbol sync detector 1430.

The differential correlator 1420 multiplies a sample value of the received signal by a sample value received previous to the current sample value by a time corresponding to an $N_S/2$ sample using the time domain signal repetition characteristic described in FIG. 10 of the sync channel OFDM symbols illustrated in FIGS. 9B and 9C and accumulates the multiplication result. Here, $N_S/2$ denotes half of the OFDM symbol duration 1070 excluding the CP duration 1050 and corresponds to the first duration 1060 or the second duration 1065. Here, the received signal corresponds to the filtered signals S3 and S4 as illustrated in FIG. 13.

Equations 3 and 4 represent outputs of the differential correlator 1420 at an arbitrary sample point n according to an embodiment of the present invention.

$$z_a(n) = \left| \sum_{i=0}^{N_{CP}+\frac{N_S}{2}-1} r_a^*(n+i) r_a\left(n+i+\frac{N_S}{2}\right) \right|^2 \quad (3)$$

$$z_a(n) = \left| \sum_{i=0}^{N_{CP}+\frac{N_S}{2}-1} r_a^*(n+i) r_a\left(n+i+\frac{N_S}{2}\right) \right| \quad (4)$$

In Equations 3 and 4, ( )*denotes a complex conjugate value, a denotes a reception antenna index having 0 or 1, and $r_a(n)$ denotes a sample value of a signal received at an $n^{th}$ sample point through an $a^{th}$ reception antenna.

A square of an absolute value and the absolute value are obtained in Equations 3 and 4 in order to maintain performance of the sync acquirer 620 regardless of an initial frequency offset. If the absolute value is not obtained in Equation 3 or 4, the performance of the sync acquirer 620 may be decreased in a state where the initial frequency offset is large.

The symbol sync detector 1430 detects a sample position having the maximum correlation value as symbol synchronization S5.

Referring to FIG. 14B, the differential correlator 1420 includes a delay unit 1422, and a correlation unit 1424. The delay unit 1422 delays the receiver baseband signal by as much as $N_S/2$ samples, and the correlation unit 1424 calculates correlation values between each sample position of the receiver baseband signal and the delayed receiver baseband signal.

Figure 15:
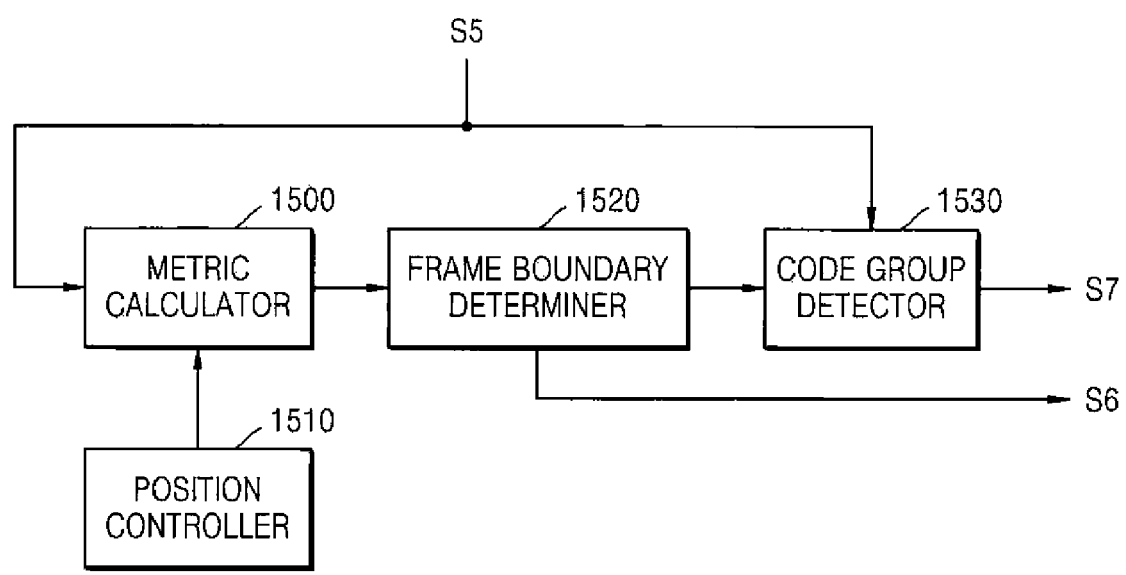
FIG. 15 is a block diagram of a boundary detector illustrated in FIG. 13, according to an embodiment of the present invention.

FIG. 15 is a block diagram of the boundary detector 1370 illustrated in FIG. 13, according to an embodiment of the present invention. The boundary detector 1370 includes a metric calculator 1500, a position controller 1510, a frame boundary determiner 1520, and a code group detector 1530.

The metric calculator 1500 calculates metrics of each hypothesis, complying with control by the position controller 1510. The position controller 1510 controls the metric calculator 1500 in order for the metric calculator 1500 to calculate the metrics of each hypothesis. For example, in order to calculate a metric of hypothesis 0, the metric calculator 1500 calculates and accumulates correlation values of sample values at 37 symbols, 37+34 symbols, and 37+34+38 symbols away from the symbol synchronization S5 according to the control of the position controller 1510. In this case, the metric calculator 1500 uses the structures of the reference signal generator 1410 and the correlator 1412 illustrated in FIG. 14A or the structure of the differential correlator 1420 illustrated in 14B in order to calculate the correlation values of each position of sample values described above. Similarly, in the case of hypothesis 1, the metric calculator 1500 calculates and accumulates correlation values of sample values at 34 symbols, 34+38 symbols, and 34+38+31 symbols away from the symbol synchronization S5. The same can be applied for hypotheses 2 and 3.

The frame boundary determiner 1520 selects one of 4 hypotheses based on an output, i.e., the metrics of each hypothesis, of the metric calculator 1500, and determines a frame boundary according to the selected hypothesis. That is, when the hypothesis having the largest metric value is hypothesis 1, the frame boundary determiner 1520 determines the frame boundary that is 74 symbols away from the symbol synchronization S5, based on hypothesis 1.

The code group detector 1530 detects a code group of a target cell by detecting hopping codewords of the target cell from all or a portion of a plurality of sync channel symbols in the obtained frame based on the frame boundary information S6. However, when a sync channel specifying the code group has not been sequence-hopped into a sync channel sequence, the boundary detector 1370 may not include the code group detector 1530.

As described above, when each code group includes single scrambling code, a 1 to 1 correspondence relationship between a hopping codeword and the scrambling code is established. Accordingly, the code group detector 1530 can detect the scrambling code from the detected code group itself. In this case, the third step of the cell search process of the method described above can be omitted, or can be performed so as to only verify the scrambling code detected in the second step of the cell search process.

The code detector 1375 extracts a common pilot channel symbol included in a received sub-frame, based on the frame boundary information obtained in the second step of the cell search process, calculates correlation values between the extracted common pilot channel symbol and scrambling codes belonging to the code group detected in the second step of the cell search process, and determines a scrambling code corresponding to the largest correlation value as a scrambling code of the current base station. That is, the common pilot channel is not only used in assuming a channel for coherent modulation of a data channel of forward link, but is also used in detecting a scrambling code in the third step of the cell search process.

The code detector 1375 only searches for scrambling codes belonging to the code group provided by the boundary detector 1370, and thus the complexity of a receiver can be reduced. That is, the system illustrated in FIG. 8 has at least 19 scrambling codes, and the code detector 1375 only needs to search for $N_c$ scrambling codes belonging to the code group detected in the second step of the cell search process from among the at least 19 scrambling codes. Here, $N_c$ is the number of scrambling codes per code group, and in FIG. 8, $N_c$ is 4.

Figure 16:
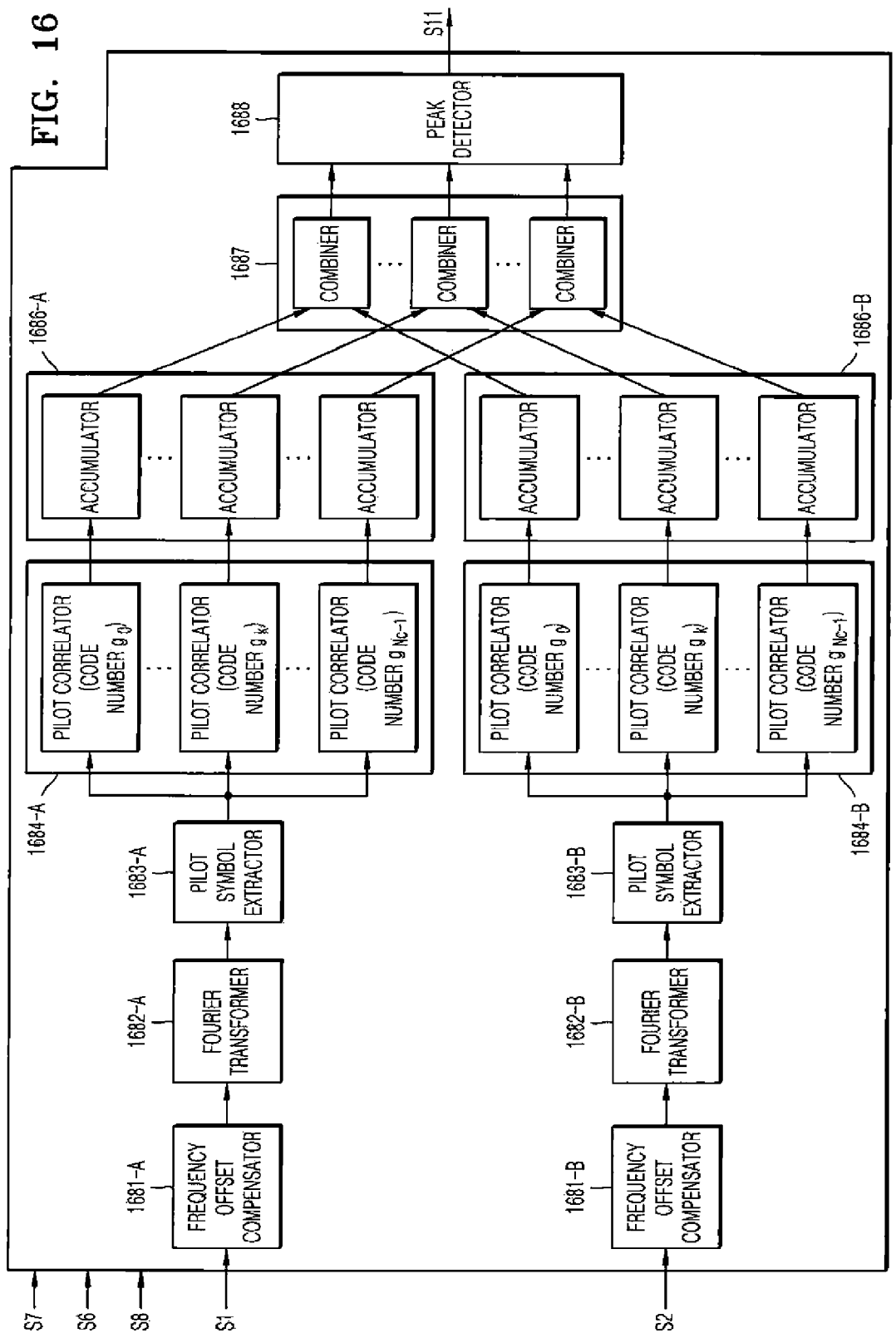
FIG. 16 is a block diagram illustrating a code detector illustrated in FIG. 13.

FIG. 16 is a block diagram illustrating the code detector 1375 illustrated in FIG. 13. Referring to FIG. 16, the code detector 1375 includes frequency offset compensators 1681-A and 1681-B, Fourier transformers 1682-A and 1682-B, pilot symbol extractors 1683-A and 1683-B, pilot correlators 1684-A and 1684-B, accumulators 1686-A and 1686-B, a combiner 1687, and a peak detector 1688.

The frequency offset compensators 1681-A and 1681-B compensates for the frequency offset of output signals S1 and S2 of down-converters 1310-A and 1310-B, based on the estimated frequency offset value S8.

Since each of the Fourier transformers 1682-A and 1682-B can detect the common pilot channel symbol duration of each sub-frame based on the frame boundary information S6 1675 received from the boundary detector 1640, each of the Fourier transformers 1682-A and 1682-B generates a frequency domain signal by performing Fourier transformation on the $N_S$ samples excluding the CP of the common pilot channel symbol contained in the output signals S1 and S2.

Each of the pilot symbol extractors 1683-A and 1683-B extracts only $N_P$ pieces of pilot symbol from the generated frequency domain signal.

Each of the pilot correlators 1684-A and 1684-B calculates correlation values of the extracted $N_P$ pieces of pilot symbol and the $N_c$ scrambling codes belonging to the code group received from the boundary detector 1640. Here, Equations 5 through 8 can be used to calculate the correlation values. Referring to FIG. 16, each of the pilot correlators 1684-A and 1684-B includes $N_c$ differential correlators performing a differential correlation operation in a parallel method. That is, each of the $N_c$ differential correlators calculates a correlation value of each extracted pilot symbol and each scrambling code belonging to the code group. Each of the $N_c$ differential correlators operates in the common pilot channel symbol duration of each sub-frame, and an output of each of the $N_c$ differential correlators is accumulated in each sub-frame accumulator included in the accumulators 1686-A and 1686-B based on the $N_c$ scrambling codes belonging to the detected code group. Equation 5 through 8 will be described later.

Each of the accumulators 1686-A and 1686-B accumulates $N_c$ correlation values calculated with respect to each common pilot channel symbol. Referring to FIG. 1, since one common pilot channel symbol per sub-frame exists, each of the accumulators 1686-A and 1686-B accumulates correlation values corresponding to a predetermined number of sub-frames. Each of the accumulators 1686-A and 1686-B includes $N_c$ sub-frame accumulators.

The combiner 1687 generates $N_c$ decision variables by combining outputs of the accumulators 1686-A and 1686-B, which are calculated through a plurality of paths according to the reception diversity realized using a plurality of antennas. It will be understood by those of ordinary skill in the art that the combiner 1687 and the blocks in the lower part can be omitted if reception diversity is not used.

The peak detector 1688 finally detects a scrambling code S11 of a current base station by detecting a decision variable having the maximum value out of the $N_c$ decision variables provided by the combiner 1687 and selecting a scrambling code corresponding to the detected decision variable. Through this process, the mobile station can detect a scrambling code of a base station having the shortest radio distance or a base station having the highest reception signal intensity. If the detected maximum value is greater than a predetermined threshold, it is considered that the cell search process has been completed, and if the detected maximum value is less than the predetermined threshold, a cell search unit according to an embodiment of the present invention repeatedly performs the first, second and third steps of the cell search process.

If each code group contains only one scrambling code, i.e., if $N_c=1$, a code group identifier respectively corresponds to a scrambling code identifier, and thus a frame boundary and a scrambling code identifier, which are the purpose of the present invention, can be detected even when only the first and second steps of the cell search process are performed. Thus, in this case, the third step of the cell search process can be omitted or used for verification of a scrambling code identifier detected in the second step of the cell search process, Also, when the code group is not detected in the second step of the cell search process, the pilot correlators 1684-A and 1684-B calculate correlation values of all of the scrambling codes in an OFDM cellular system.

An operation of the pilot correlator 1684-A or 1684-B will now be described in detail.

Figure 17:
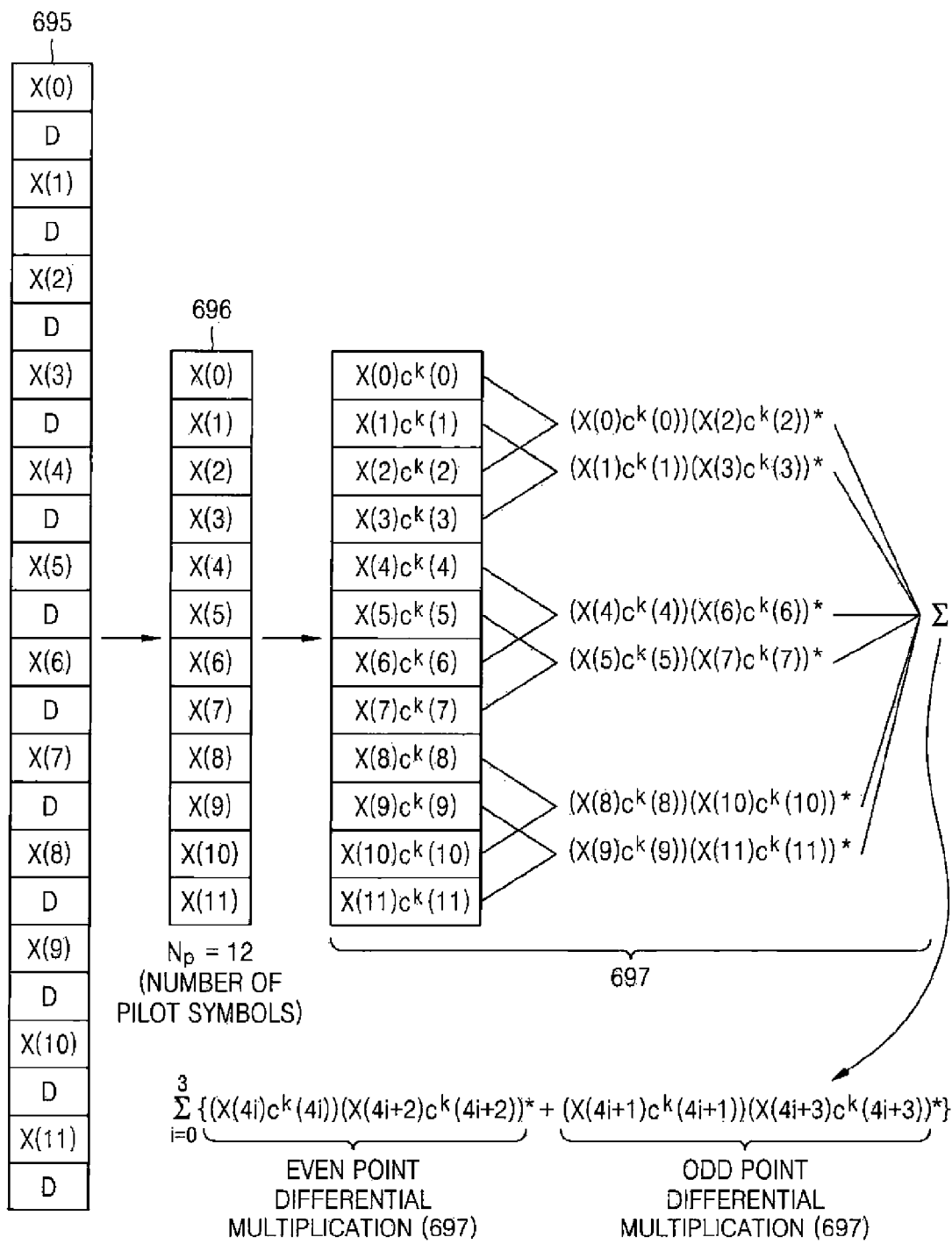
FIG. 17 is a conceptual diagram for explaining an operation of a pilot correlator according to an embodiment of the present invention.

FIG. 17 is a conceptual diagram for explaining an operation of the pilot correlator 1684-A or 1684-B according to an embodiment of the present invention.

Referring to FIG. 17, reference numerals 695 and 696 respectively denote an input and an output of the pilot symbol extractors 683-A or 683-B. That is, pilot symbol and data symbol may exist together in a frequency domain signal, and in this case, the pilot symbol extractor 683-A or 683-B extracts $N_P$ pieces of pilot symbol from the frequency domain signal 695. In FIG. 17, X(n) denotes $n^{th}$ pilot symbol from among frequency domain data of a common pilot channel symbol. In particular, in FIG. 17, the common pilot channel symbol contains $N_P$ (=12) pieces of pilot symbol.

Equations 5 through 8 represent a method of correlating the extracted pilot symbol and a scrambling code.

$$\sum_{i=0}^{\frac{N_P}{4}-1} \{(X(4i)(c_{g_k}(4i))^*)(X(4i+2)(c_{g_k}(4i+2))^*)^* + \quad (5)$$
$$(X(4i+1)(c_{g_k}(4i+1))^*)(X(4i+3)(c_{g_k}(4i+3))^*)^*\}$$

Here, $N_P$ denotes the number of pieces of pilot symbol in the frequency domain, which are contained in a common pilot channel symbol, and $c_{g_k}(u)$ denotes a $u^{th}$ element of a $k^{th}$ scrambling code out of scrambling codes belonging to a detected code group.

The differential correlation represented by Equation 5 is used in the third step of the cell search process according to an embodiment of the present invention because of the following reason. In an OFDM signaling method, adjacent symbols in the frequency domain undergo almost the same wireless fading. That is, channel distortion over the adjacent symbols is almost the same. However, wireless fading between symbols far from each other is independent if a gap between the symbols in the frequency domain is large. In this case, the performance of a conventional frequency domain correlator defined by Equation 13 is significantly decreased if a correlation length N is large.

$$\sum_{i=0}^{N-1}\{(X(i)(c(i))^*)\} \quad (6)$$

That is, since $X(i)=a_i c(i)$ in Equation 13, Equation 13 becomes $$\sum_{i=0}^{N-1} a_i,$$

and thus, a wireless fading effect is coherently added for independent symbols X( ) far from each other, and the performance of the conventional frequency domain correlator is significantly decreased in a channel that undergoes fading. Here, $a_i$ denotes a channel value of an $i^{th}$ subcarrier and has a characteristic in that channel values are almost the same for adjacent subcarriers in the fading channel but different from each other for subcarriers far from each other.

$$\sum_{i=0}^{\frac{N}{2}-1}\{(X(2i)(c(2i))^*)(X(2i+1)(c(2i+1))^*)^*\} \quad (7)$$

However, if a differential correlator defined by Equation 14 is used, a correlation value becomes $$\sum_{i=0}^{\frac{N}{2}-1} a_{2i} a^*_{2i+1} \approx \sum_{i=0}^{\frac{N}{2}-1} |a_{2i}|^2,$$

and thus a better performance can be achieved than the conventional frequency domain correlator.

In the third step of the cell search process according to an embodiment of the present invention, the reason differential multiplication is used between every other pilot symbol instead of using differential multiplication between adjacent symbols as in Equation 5 is due to the fact that the mobile station cannot detect information about a current base station to which the mobile station belongs in an initial sync acquisition mode. That is, the mobile station cannot detect whether the number of transmission antennas used in the current base station is 1 or 2.

If the number of transmission antennas is 1, all pilot symbols 696 illustrated in FIG. 17 are transmitted through the same transmission antenna. However, if the number of transmission antennas is 2, even-th pilot symbols (i.e., X(0), X(2), . . . ) are transmitted through a first transmission antenna, and odd-th pilot symbols are transmitted through a second transmission antenna. In this case, i.e., if the number of transmission antennas is 2, pilot symbols that are adjacent in the frequency domain undergo fully independent fading. In this case, if a receiver end performs differential multiplication between adjacent pilot symbols as in Equation 7, detection performance may be decreased. However, if the differential correlation according to an embodiment of the present invention is performed as illustrated by reference numeral 697 of FIG. 17, i.e., if differential multiplication 697-A between even-th pilot symbols and differential multiplication 697-B between odd-th pilot symbols are performed, a long PN scrambling code ID can be detected regardless of whether the number of transmission antennas used in the current base station is 1 or 2. In order to reduce complexity, Equation 5 can be replaced by Equation 8 by using only the even-th pilot symbol and ignoring the odd-th pilot symbol.

$$\sum_{i=0}^{\frac{N_P}{4}-1}\{(X(4i)(c_{g_k}(4i))^*)(X(4i+2)(c_{g_k}(4i+2))^*)^*\} \quad (8)$$

When the mobile station is turned on, an error of the clock generator 540 may be 3 pulses per million (PPM) or more. If this error is converted to a value used in a 2 GHz band, the error is 6 KHz or more. If a frequency offset is large in the initial cell search process, the search performance in the first step of the cell search process may be significantly decreased. There is no performance problem in the second and third steps of the cell search process since frequency offset compensation is performed.

Figure 18:
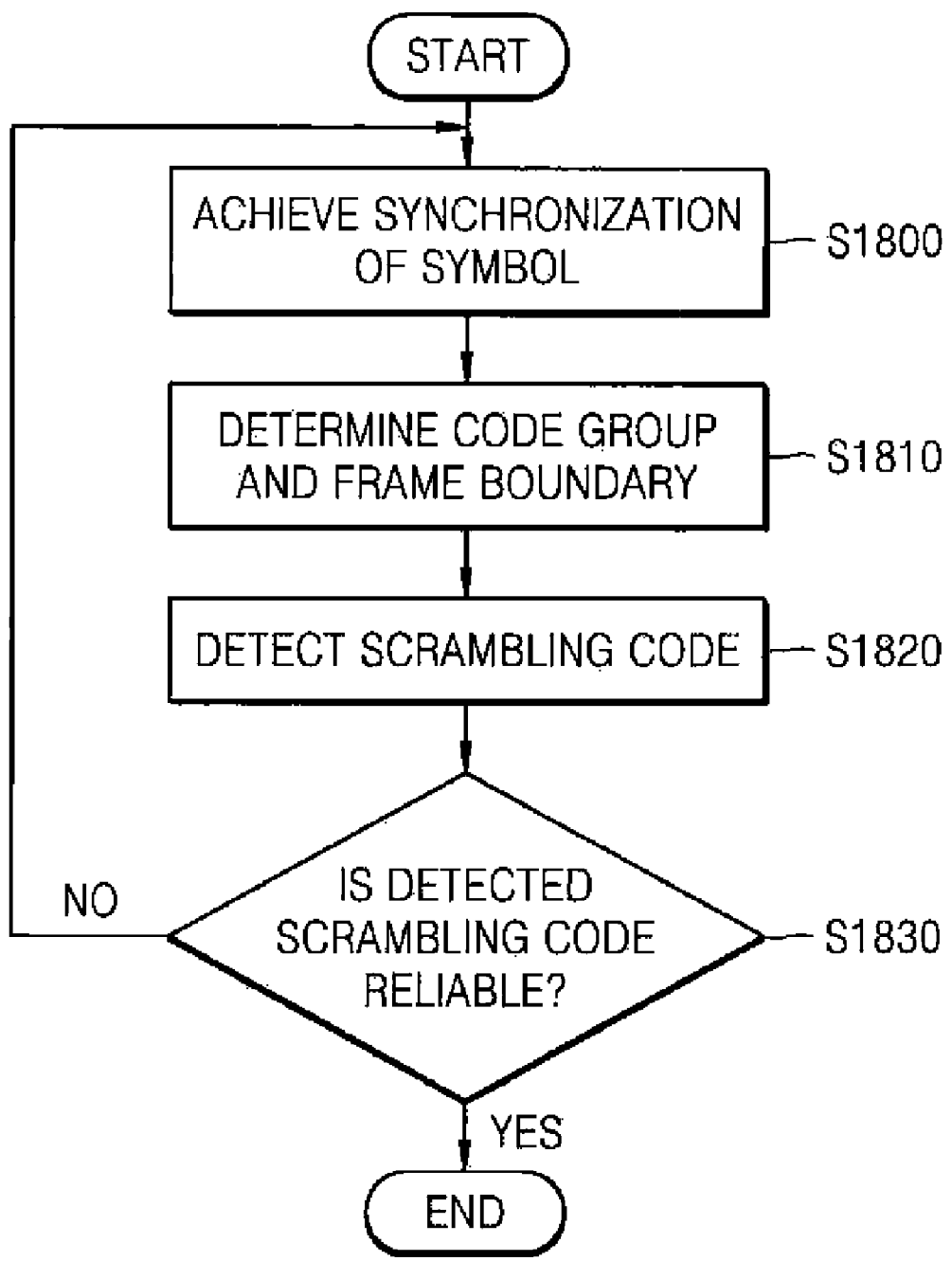
FIG. 18 is a flowchart illustrating a cell search method of a mobile station according to an embodiment of the present invention.

FIG. 18 is a flowchart illustrating a cell search method of a mobile station according to an embodiment of the present invention. Referring to FIG. 18, the mobile station's cell search method according to the current embodiment includes operations sequentially processed by the cell search unit 1320 illustrated in FIG. 13. Thus, although not fully described, the contents relating to the cell search unit 1320 also apply to the cell search method according to the current embodiment.

The sync acquirer 1365 achieves sync block synchronization, i.e. sync channel symbol timing, using a sync channel symbol of a forward link in operation S1800.

In operation S1810, the boundary detector 1370 detects a frame boundary using an interval pattern of the sync channel symbols, based on the sync block synchronization achieved in operation S1800.

In operation S1820, the code detector 1375 determines a position of the common pilot channel symbol using the information about the frame boundary detected in operation S1810, and detects a scrambling code of the target cell based on correlation values between the common pilot channel symbol and scrambling codes being used in the system.

Meanwhile, if the code group of the target cell is to be detected by the boundary detector 1370 detecting a hopping codeword included in the sync channel symbols based on the detected frame boundary in operation S1810, the code detector 1375 can detect the scrambling code of the target cell in operation S1820 by only calculating correlation values between the common pilot channel symbol and scrambling codes belonging to the detected code group.

In operation S1830, it is determined whether the detected scrambling code is reliable, and if it is determined that the detected scrambling code is not reliable, the process returns to operation S1800 and performs sync acquisition of a subsequent observing duration. If it is determined that the detected scrambling code is reliable, the detected scrambling code is considered to be a scrambling code of the home cell and the cell search process ends. A fine tuning operation for fine tuning frequency and timing can be further included after operation S1830, A method of determining whether a correlation value used to detect the scrambling code is less than a predetermined threshold value can be used as a method of determining reliability.

If each code group includes only one scrambling code, the scrambling code can be detected in operation S1810 since a hopping codeword respectively corresponds to a scrambling code. Thus, in this case, operation S1820 can be omitted. If operation S220 is performed, the scrambling code detected in operation S1820 is used for verification of the scrambling code detected in operation S1810. That is, in this case, the scrambling code detected in operation S1820 becomes a determination reference for determining reliability in operation S1830. According to this method, if the two detected scrambling codes are different from each other, the process can return to operation S1800 after operation S1820.

Figure 19:
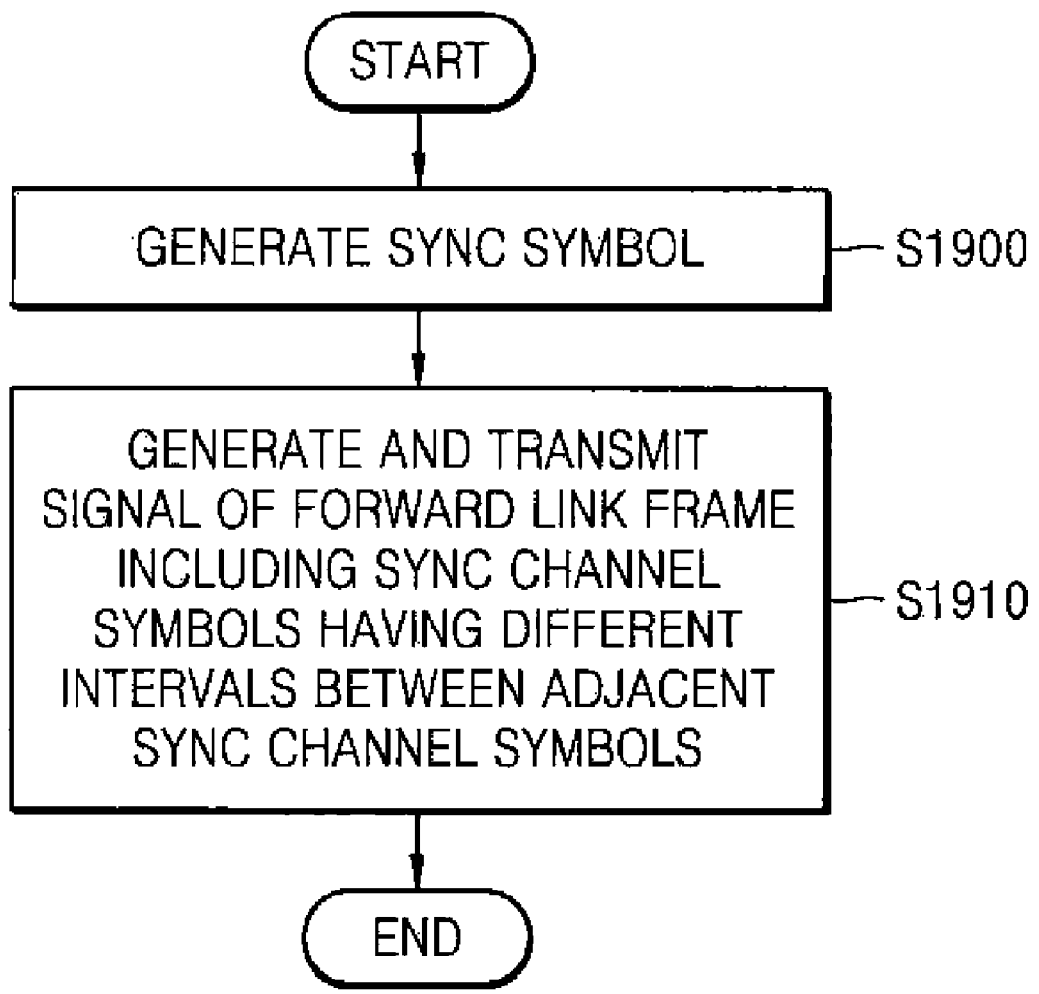
FIG. 19 is a flowchart illustrating a forward link frame transmission method of a base station according to an embodiment of the present invention.

FIG. 19 is a flowchart illustrating a forward link frame transmission method of a base station according to an embodiment of the present invention. Referring to FIG. 19, the base station's forward link frame transmission method according to the current embodiment includes operations sequentially processed by the blocks illustrated in FIG. 11. Thus, although not fully described, the contents described relating to the base station illustrated in FIG. 11 also apply to the forward link frame transmission method according to the current embodiment.

In operation S1900, the sync channel generator 1100 generates sync symbol. The sync symbol may be the same in all of the base stations of the OFDM cellular system, and may be in a form of sync channel sequences formed by a hopping codeword specifying the code group.

In operation S1910, the base station arranges each of the sync channel symbols loaded with the generated sync symbol in such a way that intervals between adjacent sync channel symbols are different, generates a signal of forward link frame based on an OFDM symbol, and transmits the generated signal.

According to the present invention, in an Orthogonal Frequency Division Multiplexing (OFDM) cellular system, a cell search time of a mobile station can be reduced, and a cell search unit operating with low complexity can be implemented. In addition, with only one sync channel, OFDM symbol synchronization, a scrambling code group ID, and a frame boundary can be detected, and frequency offset estimation can be performed.

In addition, according to a sync acquisition method, synchronization can be acquired with low complexity.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion, Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cell search apparatus in an Orthogonal Frequency-Division Multiplexing (OFDM) cellular system, the cell search apparatus comprising:
   a sync acquirer which receives a signal according to a forward link frame comprising a plurality of sub-frames and each sub-frame includes a single common pilot channel symbol and a number of the sub-frames include one sync channel symbol while a remainder of the sub-frames include no sync channel symbol such that a plurality of sync channel symbols of the forward link frame each have different intervals between the adjacent sync channel symbols and the sync acquirer achieves synchronization of the sync channel symbols using a sync channel of the received signal; and
   a boundary detector which detects a frame boundary using an interval pattern between the sync channel symbols, based on the achieved synchronization.

2. The cell search apparatus of claim 1, wherein the sync channel symbols are sequence-hopped with sync channel sequences corresponding to a code group to which a unique scrambling code of each cell belongs, and the boundary detector detects sync channel sequence information of a target cell from the received signal based on the achieved synchronization, and detects a code group having the target cell based on the detected sync channel sequence information.

3. The cell search apparatus of claim 2, wherein the code group includes single scrambling code as an element, and the boundary detector detects the scrambling code belonging to the detected code group as a scrambling code of the target cell.

4. The cell search apparatus of claim 2, wherein the forward link frame comprises at least one common pilot channel symbol scrambled with the unique scrambling code of each cell, and the cell search apparatus further comprises a code detector which calculates correlation values between each scrambling code belonging to the detected code group and the common pilot channel symbol, and detects a scrambling code of the target cell based on the calculated correlation values.

5. The cell search apparatus of claim 4, wherein the code group comprises a single scrambling code as an element, and the group detector performs verification of a result of detection by the group detector by determining whether the detected scrambling code matches a scrambling code belonging to the code group detected by the group detector.

6. A forward link frame transmission apparatus of a base station belonging to an Orthogonal Frequency-Division Multiplexing (OFDM) cellular system in which a unique scrambling code is assigned to each cell, the forward link frame transmission apparatus comprising:
   a sync channel generator which generates sync symbols; and
   a frame transmitter which generates a forward link frame based on an OFDM symbol and comprising a plurality of sub-frames and each sub-frame includes a single common pilot channel symbol and a number of the sub-frames include one sync channel symbol while a remainder of the sub-frames include no sync channel symbol and by arranging each sync channel symbol containing the generated sync symbol so as to have a different interval from adjacent sync channel symbols, and transmits a signal formed of the generated forward link frame.

7. The forward link frame transmission apparatus of claim 6, wherein the sync symbols form sync channel sequence corresponding to each element of a hopping codeword corresponding to a code group to which a scrambling code of a base station belongs.

8. The forward link frame transmission apparatus of claim 7, wherein the code group comprises single scrambling code.

9. A computer-implemented cell search method in an Orthogonal Frequency-Division Multiplexing (OFDM) cellular system, the cell search method comprising:
   (a) receiving a signal according to a forward link frame comprising a plurality of sub-frames and each sub-frame includes a single common pilot channel symbol and a number of the sub-frames include one sync channel symbol while a remainder of the sub-frames include no sync channel symbol such that a plurality of sync channel symbols each have different intervals between the adjacent sync channel symbols and achieving synchronization of the sync channel symbols using a sync channel of the received signal; and
   (b) detecting a frame boundary using an interval pattern between the sync channel symbols, based on the achieved synchronization.

10. The computer-implemented cell searching method of claim 9, wherein the sync channel symbols are sequence-hopped with sync channel sequences corresponding to a code group to which an unique scrambling code of each cell belongs, and
   the cell searching method further comprises (c) detecting sync channel sequence information of a target cell from the received signal based on the achieved synchronization, and detecting a code group to which the target cell belongs, based on the detected sync channel sequence information.

11. The computer-implemented cell searching method of claim 10, wherein the code group comprises a single scrambling code as an element, and operation (c) comprises detecting a scrambling code belonging to the detected code group as a scrambling code of the target cell.

12. The computer-implemented cell searching method of claim 10, wherein the forward link frame comprises at least one common pilot channel symbol scrambled with the unique scrambling code of each cell, and
   the cell searching method further comprises (d) calculating correlation values between each scrambling code belonging to the detected code group and the common pilot channel symbol and detecting a scrambling code of the target cell based on the calculated correlation values.

13. The computer-implemented cell searching method of claim 12, wherein the code group comprises a single scrambling code as an element, and operation (d) comprises performing verification of a result of detection by the group detector by determining whether the detected scrambling code matches a scrambling code belonging to the code group detected by the group detector.

14. A forward link frame transmission method of a base station belonging to an Orthogonal Frequency-Division Multiplexing (OFDM) cellular system in which a unique scrambling code is assigned to each cell, the forward link frame transmission method comprising:
   (a) generating sync symbols; and
   (b) generating a forward link frame based on an OFDM symbol comprising a plurality of sub-frames and each sub-frame includes a single common pilot channel symbol and a number of the sub-frames include one sync channel symbol while a remainder of the sub-frames include no sync channel symbol and by arranging each sync channel symbol containing the generated sync symbol so as to have a different interval from adjacent sync channel symbols, and transmitting a signal formed of the generated forward link frame.

15. The forward link frame transmission method of claim 14, wherein the sync symbols form sync channel sequence corresponding to each element of a hopping codeword corresponding to a code group to which a scrambling code of a base station belongs.

16. The forward link frame transmission method of claim 15, wherein the code group comprises a single scrambling code.

17. A non-transitory computer readable recording medium having recorded thereon a program for executing the method of claim 14.

18. An apparatus for transmitting a forward link frame in an Orthogonal Frequency-Division Multiplexing (OFDM) cellular system in which a unique scrambling code is assigned to each cell, the apparatus comprising:
   a sync acquirer; and
   a boundary detector;
   wherein the apparatus receives a forward link frame; the forward link frame including a plurality of sub-frames and each sub-frame includes a single common pilot channel symbol and a number of the sub-frames include one sync channel symbol while a remainder of the sub-frames include no sync channel symbol such that a plurality of sync channel symbols have different intervals between the adjacent sync channel symbols in order for a boundary detector to detect a frame boundary using an interval pattern between the sync channel symbols.

19. A non-transitory computer readable recording medium having recorded thereon a program for executing the method of claim 15.

20. A non-transitory computer readable recording medium having recorded thereon a program for executing the method of claim 16.

* * * * *